(12) United States Patent
Monyei et al.

(10) Patent No.: US 12,333,457 B1
(45) Date of Patent: Jun. 17, 2025

(54) ARTIFICIAL INTELLIGENCE-BASED PRICING, MAPPING, AND EMISSIONS CONTROL SYSTEM AND METHOD FOR OPTIMIZED INNER-CITY MOBILITY

(71) Applicant: Escrow-Tech Limited, Bristol (GB)

(72) Inventors: Chukwuka Gideon Monyei, Bristol (GB); Jennifer Ifechi Alphonsus, Bristol (GB)

(73) Assignee: ESCROW-TECH LIMITED, Bristol (GB)

( * ) Notice: Subject to any disclaimer, the term of this patent is extended or adjusted under 35 U.S.C. 154(b) by 0 days.

(21) Appl. No.: 18/759,717

(22) Filed: Jun. 28, 2024

(51) Int. Cl.
*G06Q 10/047* (2023.01)
*G06Q 30/0201* (2023.01)
*G06Q 30/0202* (2023.01)
*G06Q 50/40* (2024.01)

(52) U.S. Cl.
CPC ....... *G06Q 10/047* (2013.01); *G06Q 30/0202* (2013.01); *G06Q 30/0206* (2013.01); *G06Q 50/40* (2024.01)

(58) Field of Classification Search
CPC ............. G06Q 10/047; G06Q 30/0202; G06Q 30/0206; G06Q 50/40
USPC ....................................................... 701/533
See application file for complete search history.

(56) References Cited

U.S. PATENT DOCUMENTS

| | | | | |
|---|---|---|---|---|
| 2020/0404051 | A1* | 12/2020 | Guniguntala | H04L 67/10 |
| 2021/0312375 | A1* | 10/2021 | Khasis | G01C 21/3492 |

FOREIGN PATENT DOCUMENTS

| | | | |
|---|---|---|---|
| CN | 113128606 | * | 7/2021 |
| DE | 102023118874 | * | 1/2024 |
| DE | 112011104561 | * | 1/2024 |

* cited by examiner

*Primary Examiner* — Muhammad Shafi
(74) *Attorney, Agent, or Firm* — Galvin Patent Law LLC; Brian R. Galvin

(57) ABSTRACT

A system and method for AI-based dynamic pricing, mapping, and emissions control to optimize inner-city mobility. The system acquires real-time nitrogen dioxide data across a geographic area from sources including satellites, feeds this data into a decision support system along with road-specific weight matrices from authorities, and updates a dynamic penalty matrix for roads in the area. Automatic number plate recognition tracks vehicle movement, queries vehicle databases for emissions profiles, and updates the platform. Users input journey parameters and the system, using AI tools including a genetic algorithm economic and environmental dispatch (GA-EED) optimizer, generates an optimized route based on user-selected criteria such as time, emissions, penalty, and cost. The system enables dynamic, environmentally-aware route optimization for inner-city mobility.

30 Claims, 14 Drawing Sheets

ARTIFICIAL INTELLIGENCE-BASED PRICING, MAPPING, AND EMISSIONS CONTROL SYSTEM AND METHOD FOR OPTIMIZED INNER-CITY MOBILITY

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The present invention is in the field of urban mobility management, and more particularly to artificial intelligence-based dynamic pricing, mapping, and emissions control to optimize inner-city transportation networks while considering environmental impact.

Discussion of the State of the Art

Existing navigation platforms generate routes based on limited criteria like shortest distance or time. They do not dynamically incorporate real-time data on road emissions levels, variable emissions-based pricing, or multi-objective user preferences. This results in suboptimal routing from an environmental and economic perspective, especially in inner-cities with high congestion and emissions levels.

Current navigation systems and platforms, whether in-vehicle or smartphone-based, generally focus on optimizing routes based on a limited set of criteria, primarily distance, estimated time of arrival, and sometimes traffic conditions. While these factors are important, they do not fully account for the environmental impact of the suggested routes, particularly in urban areas where traffic congestion and air pollution are significant concerns.

Existing routing algorithms often do not take into account real-time emissions data, such as atmospheric nitrogen dioxide ($NO2$) concentrations, which can vary significantly across different road segments and times. This lack of environmental awareness in route planning can lead to increased emissions and exposure to pollutants for drivers and residents in high-traffic areas.

Moreover, current systems do not typically incorporate dynamic, emissions-based road pricing, which could incentivize drivers to choose more environmentally friendly routes. While some cities have implemented congestion charging or low-emission zones, these schemes often rely on fixed, time-based pricing or static zone boundaries, rather than real-time, location-specific emissions data.

Another limitation of current systems is the lack of integration with comprehensive vehicle databases that include detailed emissions profiles. Without this information, routing algorithms cannot optimize based on the specific environmental performance of individual vehicles.

Furthermore, while some navigation platforms offer options for optimizing routes based on factors like fuel efficiency or cost, they often do not allow users to specify multiple, weighted criteria for route optimization. This lack of flexibility limits the ability of users to prioritize their preferences and make informed trade-offs between factors such as emissions, time, and cost.

Finally, existing systems do not typically leverage advanced artificial intelligence (AI) techniques, such as genetic algorithms, for multi-objective route optimization. These techniques have the potential to find more efficient and environmentally friendly routes by simultaneously considering a wide range of optimization criteria and adapting to dynamic, real-time data.

The current state of the art in navigation and routing systems has significant limitations in terms of environmental awareness, dynamic emissions-based pricing, vehicle-specific optimization, multi-criteria user preferences, and the application of advanced AI techniques. These limitations result in suboptimal routing from an environmental and economic perspective, particularly in congested urban areas.

What is needed is an AI-based system that addresses these shortcomings by integrating real-time emissions data, dynamic pricing, vehicle-specific information, user priorities, and flexible, multi-objective optimization to enable more sustainable and efficient inner-city mobility.

SUMMARY OF THE INVENTION

Accordingly, the inventor has conceived and reduced to practice, a system and method for AI-based dynamic pricing, mapping, and emissions control to optimize inner-city mobility. The system acquires real-time nitrogen dioxide data across a geographic area from sources including satellites, feeds this data into a decision support system along with road-specific weight matrices from authorities, and updates a dynamic penalty matrix for roads in the area. Automatic number plate recognition tracks vehicle movement, queries vehicle databases for emissions profiles, and updates the platform. Users input journey parameters and the system, using AI tools including a genetic algorithm economic and environmental dispatch (GA-EED) optimizer, generates an optimized route based on user-selected criteria such as time, emissions, penalty, and cost. The system enables dynamic, environmentally-aware route optimization for inner-city mobility.

According to a preferred embodiment, an artificial intelligence based platform for dynamic optimization of a transportation network is disclosed, comprising: a computing device comprising at least a memory and a processor; a plurality of programming instructions stored in the memory and operable on the processor, wherein the plurality of programming instructions, when operating on the processor, cause the computing device to: acquire and process real-time and historical data from a plurality of sensors and external data sources to generate a multi-dimensional representation of the transportation network state; generate a dynamic pricing model for segments of the transportation network based on the multi-dimensional network state representation and a set of pricing policies; track and predict the behavior of users and vehicles in the transportation network using real-time data and machine learning models; generate a set of optimized route and pricing options for users by applying a multi-objective optimization algorithm to the dynamic pricing model and the predicted user and vehicle behavior, while satisfying a set of feasibility constraints; present the optimized route and pricing options to users via an interactive user interface and receive user feedback; adapt the dynamic pricing model, the user and vehicle behavior models, and the optimization algorithm based on the received user feedback and the evolving transportation network state; and manage and orchestrate the data flows and interactions between the system components using a centralized or decentralized architecture.

According to another preferred embodiment, a method for dynamic optimization of a transportation network is disclose, comprising the steps of: acquiring and processing real-time and historical data from a plurality of sensors and external data sources to generate a multi-dimensional representation of the transportation network state; generating a dynamic pricing model for segments of the transportation network based on the multi-dimensional network state representation and a set of pricing policies; tracking and predicting the behavior of users and vehicles in the transportation network using real-time data and machine learning models; generating a set of optimized route and pricing options for users by applying a multi-objective optimization algorithm to the dynamic pricing model and the predicted user and vehicle behavior, while satisfying a set of feasibility constraints; presenting the optimized route and pricing options to users via an interactive user interface and receiving user feedback; adapting the dynamic pricing model, the user and vehicle behavior models, and the optimization algorithm based on the received user feedback and the evolving transportation network state; and managing and orchestrating the data flows and interactions between the system components using a centralized or decentralized architecture.

According to another preferred embodiment, non-transitory, computer-readable storage media having computer-executable instructions embodied thereon that, when executed by one or more processors of a computing system employing an artificial intelligence based platform for dynamic optimization of a transportation network, cause the computing system to: acquire and process real-time and historical data from a plurality of sensors and external data sources to generate a multi-dimensional representation of the transportation network state; generate a dynamic pricing model for segments of the transportation network based on the multi-dimensional network state representation and a set of pricing policies; track and predict the behavior of users and vehicles in the transportation network using real-time data and machine learning models; generate a set of optimized route and pricing options for users by applying a multi-objective optimization algorithm to the dynamic pricing model and the predicted user and vehicle behavior, while satisfying a set of feasibility constraints; present the optimized route and pricing options to users via an interactive user interface and receive user feedback; adapt the dynamic pricing model, the user and vehicle behavior models, and the optimization algorithm based on the received user feedback and the evolving transportation network state; and manage and orchestrate the data flows and interactions between the system components using a centralized or decentralized architecture.

According to an aspect of an embodiment, the transportation network is an inner-city road network, and the optimization objectives comprise minimizing travel time, emissions, and cost for users and the system operator.

According to an aspect of an embodiment, the multi-dimensional network state representation comprises data layers for traffic flow, congestion, emissions, weather, events, and road conditions.

According to an aspect of an embodiment, the dynamic pricing model is based on a combination of historical data, real-time data, and future predictions, and takes into account factors such as demand, supply, elasticity, and competition.

According to an aspect of an embodiment, the user and vehicle behavior models are based on machine learning techniques such as deep learning, reinforcement learning, or Bayesian inference, and are trained on large-scale data sets of user preferences, choice behavior, and vehicle trajectories.

According to an aspect of an embodiment, the multi-objective optimization algorithm is based on a metaheuristic such as genetic algorithms, particle swarm optimization, or simulated annealing, and is adapted to handle dynamic and stochastic problem instances.

According to an aspect of an embodiment, the interactive user interface comprises features for personalization, gamification, and incentivization to encourage user engagement and behavior change.

According to an aspect of an embodiment, the multi-objective optimization algorithm comprises a genetic algorithm economic and environmental dispatch (GA-EED) tool that optimizes the selection of routes considering various economic and environmental criteria, such as minimizing fuel consumption, emissions, travel time, and road congestion, while balancing the trade-offs between these criteria based on user preferences and system goals.

According to an aspect of an embodiment, the platform integrates with an improved comfort biased smart home load manager to optimize the charging and discharging of electric vehicles (EVs) at home, considering the user's comfort preferences, energy prices, and emissions intensity of the grid, and provides personalized recommendations and incentives to the user for optimizing their EV usage and home energy consumption, thereby adapting the user and vehicle behavior models based on the received user feedback.

According to an aspect of an embodiment, the platform incorporates a penalty matrix that assigns numerical costs to each road segment based on factors such as environmental impact, congestion, road pricing, safety risk, and user preferences, and updates the penalty matrix dynamically based on real-time data from sensors, weather stations, and traffic management systems, thereby adapting the dynamic pricing model based on the evolving transportation network state.

BRIEF DESCRIPTION OF THE DRAWING FIGURES

DETAILED DESCRIPTION OF THE INVENTION

Figure 1:
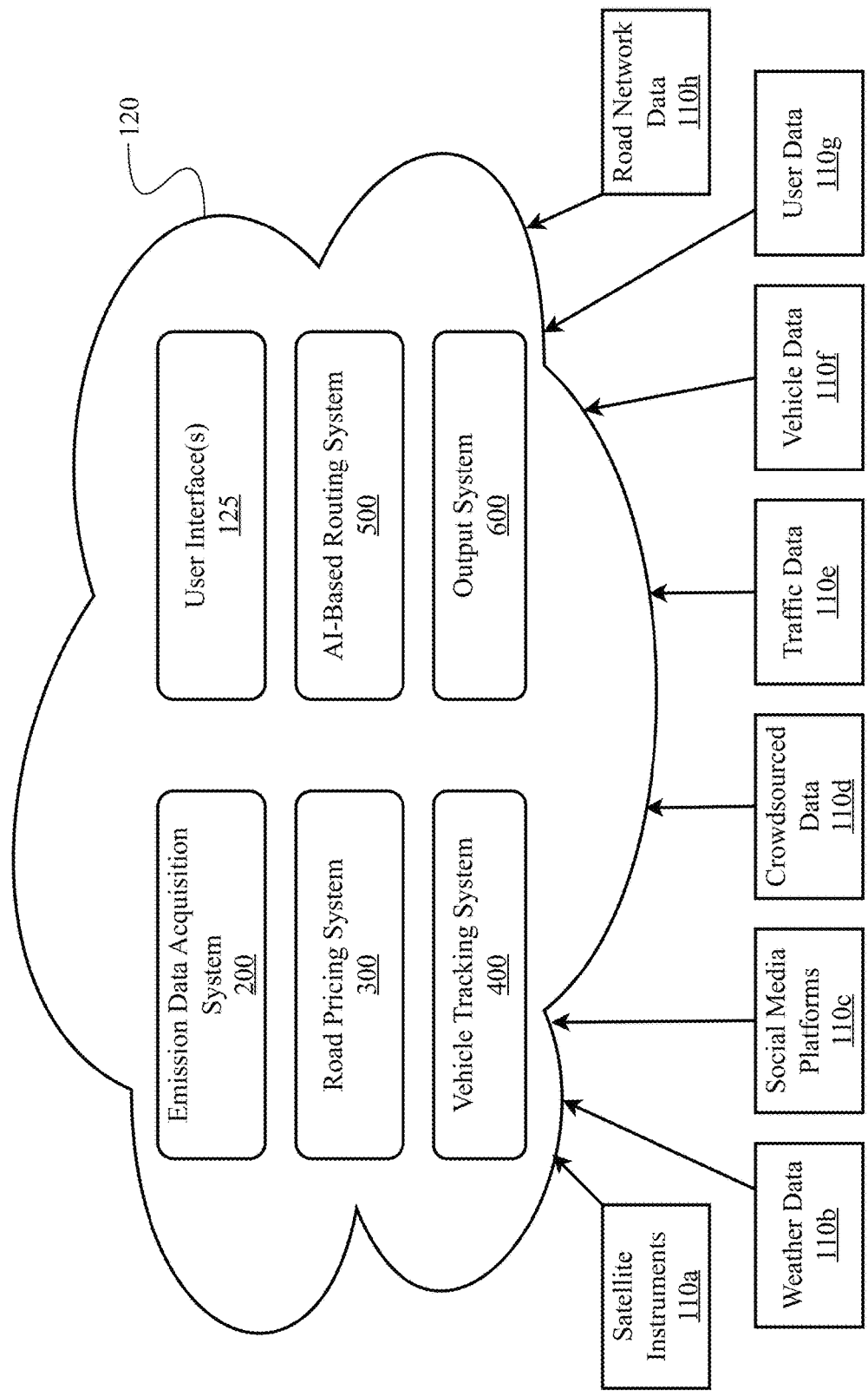
FIG. 1 is a block diagram illustrating an exemplary system architecture for an artificial intelligence-based pricing, mapping, and emissions control platform, according to an embodiment.

The inventor has conceived, and reduced to practice, a system and method for AI-based dynamic pricing, mapping, and emissions control to optimize inner-city mobility. The system acquires real-time nitrogen dioxide data across a geographic area from sources including satellites, feeds this data into a decision support system along with road-specific weight matrices from authorities, and updates a dynamic penalty matrix for roads in the area. Automatic number plate recognition tracks vehicle movement, queries vehicle databases for emissions profiles, and updates the platform. Users input journey parameters and the system, using AI tools including a genetic algorithm economic and environmental dispatch (GA-EED) optimizer, generates an optimized route based on user-selected criteria such as time, emissions, penalty, and cost. The system enables dynamic, environmentally-aware route optimization for inner-city mobility.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture for an artificial intelligence-based pricing, mapping, and emissions control platform 120, according to an embodiment. According to the embodiment, platform 120 is configured as a cloud-based computing platform comprising various system or sub-system components configured to provide functionality directed to the execution of generating pricing and emissions context aware vehicle routing using artificial intelligence and machine learning techniques. Exemplary platform systems can include a user interface 125, a data processing subsystem 200, a machine learning and artificial intelligence (ML/AI) subsystem 300, an emission data acquisition system 200, a road pricing system 300, a vehicle tracking system 400, an AI-based routing system 500, and an output system 600. A user, AI agent, simulation/simulation result, or telematics may be used to request an optimized route based on multi-variate factors and constraints. According to an embodiment, platform 120 users can specify output targets such as, for example, user-specified output formats, downstream applications, and/or the like.

In some embodiments, subsystems 200-600, 125 may each be implemented as standalone software applications or as a services/microservices architecture which can be deployed (via platform 120) to perform a specific task or functionality. In such an arrangement, services can communicate with each other over an appropriate network using lightweight protocols such as HTTP, gRPC, or message queues. This allows for asynchronous and decoupled communication between services. Services may be scaled independently based on demand, which allows for better resource utilization and improved performance. Services may be deployed using containerization technologies such as Docker or containerd and orchestrated using container orchestration platforms like Kubernetes. This allows for easier deployment and management of services.

The emissions data acquisition system 200 provides a foundation for assessing the environmental impact of urban mobility and designing effective strategies for reducing emissions. Road transportation is a significant contributor to air pollution, particularly in urban areas, and is responsible for emitting various pollutants such as nitrogen oxides (NOx), particulate matter (PM), carbon monoxide (CO), and volatile organic compounds (VOCs). These pollutants have diverse and severe impacts on human health, including respiratory and cardiovascular diseases, cancer, and premature mortality, as well as on the environment, such as acid rain, eutrophication, and biodiversity loss. Monitoring and reducing transportation emissions is therefore vital for improving air quality, protecting public health, and mitigating climate change, and is a key objective of sustainable urban mobility policies and plans.

There are various technologies and methods for monitoring transportation emissions which may be implemented, individually or in combination, in different embodiments of platform 120, each with its own advantages and limitations in terms of coverage, resolution, accuracy, and cost. Satellite-based monitoring, such as using data from Sentinel-5P or Aura, provides a global and consistent view of the atmospheric composition, but has a relatively low spatial and temporal resolution and may be affected by weather conditions or surface properties. Ground-based monitoring, such as using data from air quality stations or sensor networks, provides a more local and detailed view of the emissions, but has a limited spatial coverage and may not capture the full variability and dynamics of the emissions. Mobile monitoring, such as using data from vehicle-based or drone-based sensors, provides a more flexible and responsive view of the emissions, but may have a higher cost and complexity and may require careful calibration and validation. Emissions modeling, such as using data from traffic models or emission factors, provides a more comprehensive and predictive view of the emissions, but may have a lower accuracy and reliability and may depend on various assumptions and uncertainties.

Integrating and fusing data from multiple emissions monitoring sources can help overcome their individual limitations and provide a more robust and reliable view of the emissions. Data integration involves combining data from different sources and formats into a common and consistent representation, using techniques such as data mapping, data cleaning, and data harmonization. Data fusion involves combining data from different sources and types into a more accurate and complete estimate, using techniques such as data assimilation, data interpolation, and data weighting. Data emissions acquisition system 200 may provide mechanisms and techniques for emissions data integration and fusion that benefit from advanced data science and machine learning techniques, such as deep learning, Bayesian networks, and ensemble methods, which can learn from the data and adapt to the changing conditions and uncertainties.

The emissions data acquired and processed by system 200 can enable various applications and services for sustainable urban mobility, such as: emissions-based pricing, such as dynamic road tolling or parking fees, which incentivize the use of cleaner vehicles or routes and discourage the use of polluting ones; emissions-based routing, such as eco-routing or green navigation, which recommend the most environmentally friendly routes or modes of transportation based on the real-time emissions data; emissions-based planning, such as identifying emission hotspots or evaluating the impact of transportation policies and projects on air quality and public health; and emissions-based monitoring, such as providing real-time information and alerts on the air quality levels and the associated health risks to the public and the authorities.

The emissions data acquisition and use raise various governance and ethical issues, such as data privacy, data security, data ownership, and data fairness, which need to be carefully addressed and regulated. For example, the emissions data may contain sensitive or personal information, such as the location and behavior of individuals or vehicles, which need to be protected and anonymized according to the relevant data protection laws and standards. Furthermore, the emissions data may also have biases or errors, such as under-representing certain areas or populations, which need to be identified and corrected to ensure the fairness and inclusiveness of the applications and services based on the data.

The road pricing system 300 plays a role in the AI-based system by providing the economic incentives for environmentally sustainable routing. By dynamically adjusting road prices based at least on real-time emissions data, it encourages drivers to avoid highly polluted areas and to spread out traffic more evenly across the road network. This approach has several benefits over traditional static pricing schemes, such as congestion charges or low-emission zones. First, it provides a more fine-grained and targeted incentive structure, as prices can vary continuously based on the actual emissions levels on each road segment. Second, it allows for more flexible and adaptive pricing, as prices can be adjusted in real-time based on changing traffic and emissions conditions. Third, it provides a more transparent and fair pricing system, as drivers are charged based on their actual contribution to emissions rather than a fixed fee.

However, implementing a dynamic road pricing scheme also presents several challenges. First, it requires a reliable and accurate source of real-time emissions data, which may be difficult to obtain in some areas. Second, it requires a sophisticated pricing algorithm that can balance multiple objectives, such as reducing emissions, managing congestion, and ensuring social equity. Third, it requires effective communication and enforcement mechanisms to ensure that drivers are aware of and compliant with the pricing scheme.

To address these challenges, the road pricing system can be designed with flexibility, scalability, and interoperability in mind. It may be able to integrate with various data sources and adapt to different pricing models and policies. It can also provide clear and timely information to drivers about the current prices and the potential benefits of taking alternative routes. Finally, it can work in concert with other systems, such as the AI-based routing system 500 and the user interface 125, to provide a seamless and integrated user experience.

According to an embodiment, pricing system 300 and or vehicle tracking system 400 can acquire and process real-time and historical data from a plurality of sensors and external data sources to generate a multi-dimensional representation of the transportation network state. The AI-based system can generate a multi-dimensional representation of the transportation network state by integrating various data sources and using advanced data processing and modeling techniques. This multi-dimensional representation can capture the complex dynamics and interactions within the transportation network, enabling the system to make informed decisions and optimize its performance. The system collects real-time and historical data from a wide range of sources, such as: traffic sensors (e.g., road-embedded sensors, cameras, and radar systems that measure traffic flow, speed, and density), GPS data (e.g., anonymized location data from vehicles and mobile devices that provide insights into travel patterns and route choices), weather data (e.g., meteorological data that affect traffic conditions, such as precipitation, temperature, and wind speed), emission data (e.g., sensors that measure air quality and pollutant concentrations, such as nitrogen oxides and particulate matter), event data (e.g., information about planned events, road closures, and construction activities that impact traffic), and user feedback (e.g., ratings, comments, and reports from users about their travel experiences and preferences).

The raw data collected from various sources is cleaned, filtered, and transformed to ensure consistency, accuracy, and reliability. This may involve techniques such as data normalization, outlier detection, and missing value imputation. The preprocessed data is analyzed to extract relevant features and patterns that characterize the transportation network state. This may include statistical measures (e.g., average speed, traffic volume), spatial-temporal patterns (e.g., congestion hotspots, peak hours), and derived indicators (e.g., road safety index, environmental impact score). The extracted features from different data sources are integrated and fused to create a comprehensive and coherent representation of the transportation network state. This may involve techniques such as data alignment, correlation analysis, and machine learning-based data fusion.

The fused data may be used to build a multi-dimensional model of the transportation network state, which captures the complex relationships and dependencies among different factors. This model can be represented using various techniques, such as graph-based models, tensor-based models, and deep learning models. The transportation network can be modeled as a graph, with nodes representing intersections or locations and edges representing road segments. Each node and edge can have multiple attributes, such as traffic volume, speed, emissions, and pricing. The transportation network state can be represented as a multi-dimensional tensor, where each dimension corresponds to a specific aspect, such as location, time, mode of transportation, and user type. This allows for efficient storage and processing of high-dimensional data. Additionally, or alternatively, advanced neural network architectures, such as convolutional neural networks (CNNs) and graph neural networks (GNNs), may be used to learn the complex patterns and dependencies within the transportation network state from large-scale data. The multi-dimensional representation of the transportation network state is continuously updated in real-time as new data becomes available. This allows the system to adapt to changing conditions and provide up-to-date insights and recommendations.

By generating a multi-dimensional representation of the transportation network state, the AI-based platform can capture the complex dynamics and interactions within the network, enabling it to make informed decisions and optimize its performance in terms of traffic management, emissions reduction, and user experience. This representation may serve as a foundation for various optimization algorithms and decision support tools within the platform.

Furthermore, platform 120 can generate one or more dynamic pricing models for segments of the transportation network based on the multi-dimensional network state representation and a set of pricing policies. Examples of pricing policies can include, but are not limited to, congestion pricing, time-of-day pricing, distance-based pricing, emissions-based pricing, dynamic demand-based pricing, user-specific pricing, and multi-modal pricing. These pricing policies can be used individually or in combination, depending on the specific goals and constraints of the transportation network. The AI-based platform can dynamically adjust and optimize these policies based on real-time data and user feedback to achieve the desired outcomes, such as reduced congestion, lower emissions, and improved user satisfaction.

Congestion pricing adjusts prices based on the level of congestion on a particular road segment or area. During peak hours or in heavily congested areas, the system may increase prices to discourage traffic and reduce congestion. Conversely, prices may be lowered during off-peak hours or in less congested areas to incentivize use. Time-of-day pricing sets different prices depending on the time of day. For example, prices may be higher during rush hours (e.g., 7-9 AM and 4-6 PM) and lower during off-peak hours. This encourages users to plan their trips during less busy times, helping to distribute traffic more evenly throughout the day. Distance-based pricing, under this policy, prices are determined based on the distance traveled by the user. Longer trips would incur higher costs, while shorter trips would be less expensive. This policy encourages users to optimize their route choices and reduce unnecessary travel. Emissions-based pricing takes into account the environmental impact of transportation. Vehicles with higher emissions (e.g., older or less efficient vehicles) would be charged higher prices, while cleaner vehicles (e.g., electric or hybrid cars) would enjoy lower prices. This encourages the adoption of more environmentally friendly transportation options. Dynamic demand-based pricing adjusts prices in real-time based on the current demand for transportation services. When demand is high, prices increase to balance the supply and demand, and when demand is low, prices decrease to attract more users. This helps to optimize the utilization of the transportation network. User-specific pricing offers personalized prices based on individual user preferences, behavior, and history. For example, frequent users or those who consistently choose eco-friendly routes may receive discounts or rewards. This policy encourages user loyalty and promotes sustainable transportation habits. Multi-modal pricing integrates pricing across different modes of transportation, such as public transit, ride-sharing, and bike-sharing. Users are encouraged to choose the most efficient and sustainable combination of modes for their trip, with prices adjusted accordingly. This helps to optimize the use of the entire transportation network.

In one embodiment, the transportation network is an inner-city road network, and the optimization objectives include minimizing travel time, emissions, and cost for users and the system operator. In some implementations, the dynamic pricing model is based on a combination of historical data, real-time data, and future predictions, and takes into account factors such as demand, supply, elasticity, and competition.

The vehicle tracking system 400 enables the AI-based platform 120 to generate highly personalized and environmentally optimized routes for individual vehicles. By tracking the real-time position, speed, and emissions of each vehicle, the system can dynamically adjust the route recommendations based on the current traffic and emissions conditions. This approach has several advantages over traditional navigation systems that rely on static, aggregate traffic data. First, it allows for more accurate and up-to-date estimation of travel times and emissions, as it takes into account the specific characteristics and behavior of each vehicle. Second, it enables proactive rerouting and congestion management, as the system can anticipate and mitigate potential bottlenecks before they occur. Third, it provides a more engaging and interactive user experience, as drivers can receive real-time updates and alerts about their route and emissions performance. According to an aspect, the multi-dimensional network state representation includes data layers provided by tracking system 400 for traffic flow, congestion, emissions, weather, events, and road conditions The implementation of a comprehensive vehicle tracking system may require a large-scale deployment of sensors and communication infrastructure to cover the entire road network and the the massive amount of data generated needs to be efficiently processed, stored, and analyzed in real-time. To address these challenges, vehicle tracking system 400 can be designed with scalability, reliability, and security in mind. It can leverage cloud computing and big data technologies to handle the large volume and velocity of the vehicle data. It may also implement strict data governance and access control policies to protect user privacy and prevent unauthorized use of the data.

Furthermore, vehicle tracking system 400 may be seamlessly integrated with the other components of the AI-based platform, such as the emissions data acquisition, road pricing, and routing systems. This necessitates a modular and interoperable architecture that allows for easy data exchange and workflow coordination between the different modules.

The AI-based routing system 500 represents a significant advancement over traditional routing systems, which typically optimize for a single objective (e.g., shortest distance or time) and rely on static, historical data. By incorporating real-time data on emissions, pricing, and traffic, and using advanced optimization and machine learning techniques, the system can generate routes that are more environmentally sustainable, cost-effective, and adaptive to the dynamic conditions of the urban mobility system.

However, developing and deploying such a module also presents several challenges and considerations. First, it requires a robust and scalable data infrastructure to handle the large volume, variety, and velocity of the real-time data from the different sources. Second, it needs to balance the multiple, often conflicting objectives and preferences of the users, such as minimizing time, cost, and emissions, while ensuring safety, comfort, and reliability. Third, it must be able to handle the uncertainty and variability of the traffic and emissions conditions, and provide robust and flexible solutions that can adapt to the changing circumstances.

According to an embodiment, the AI-based routing system 500 may be designed with the users' needs and behaviors in mind, and provide an intuitive and engaging interface that allows them to express their preferences and constraints, and receive personalized and actionable recommendations. It may also be transparent and explainable, so that the users can understand and trust the rationale behind the route suggestions, and provide feedback and corrections when needed.

Finally, AI-based routing system 500 may be evaluated and validated rigorously, using both simulation and real-world experiments, to assess its effectiveness, efficiency, and robustness, and to identify and address any limitations or unintended consequences. This requires close collaboration and communication with the various stakeholders, such as the users, the operators, the regulators, and the public, to ensure the system's alignment with the broader goals and values of the urban mobility system.

The output system 600 provides an interface to platform users, and offers a seamless and enjoyable user experience that meets or exceeds the users' expectations, while also educating and empowering them to make informed and sustainable mobility choices.

Output system 600 can handle the diversity and dynamicity of the user preferences, contexts, and constraints, and provide personalized and adaptive recommendations that cater to their individual needs and goals. It may also be able to explain and justify the recommendations, and allow the users to provide feedback or override the system when needed.

Additionally, output system 600 can be configured to ensure the privacy, security, and transparency of the user data and interactions, and comply with relevant regulations and standards. It may provide clear and concise information about the data collection, usage, and sharing practices, and obtain the user's informed consent when necessary.

Closely related to output system 600 are various user interfaces 125 that are provided by platform 120. While they are closely related and interconnected, they can be considered as separate components with distinct roles and characteristics. The output system 600 is a broader concept that encompasses the various components and functionalities responsible for delivering the optimized routes and navigation guidance to the users. It includes not only the user interfaces but also the backend systems and algorithms that process the data and generate the outputs, such as the map rendering engine, the turn-by-turn navigation system, and the personalization and customization algorithms. The output system focuses on the technical aspects of delivering the information to the users, such as the data formats, communication protocols, and performance optimization. It aims to provide a seamless and efficient flow of information from the AI-based routing system to the users, regardless of the specific user interface or device they are using.

The user interfaces 125 are the specific components of the output system that enable the interaction between the users and the AI-based routing system. They can provide the visual, auditory, or haptic means for the users to input their preferences and constraints, view the recommended routes and navigation guidance, and provide feedback or report issues. The user interfaces can take various forms and designs, depending on the platform, device, embodiment, and context of use, such as: mobile app interfaces for smartphones or tablets, with touch-based interactions and location-based services; web-based interfaces for desktop or laptop computers, with mouse and keyboard interactions and more detailed information displays; in-vehicle interfaces for cars or trucks, with voice-based interactions and heads-up displays integrated with the vehicle's sensors and systems; and wearable interfaces for smartwatches or smart glasses, with gesture-based interactions and augmented reality features. For instance, the user interfaces 125 focus on the usability, accessibility, and user experience aspects of delivering the information to the users, such as the layout, typography, color scheme, and interaction design. They are designed to provide an intuitive, engaging, and satisfying experience for the users, that meets their needs, preferences, and expectations, and encourages them to use and trust the AI-based routing system.

In an embodiment, platform 120 can provide an interface 125 wherein end-users can input journey parameters or details to prompt the routing system to generate an optimized pathway/route/journey for vehicular transportation. The user can select journey details such as a start location, an end location, an optimization schedule, penalty (e.g., pathway that fines the user the least), fuel (e.g., pathway that uses the least fuel or electricity for battery usage), a time constraint (e.g., start/end time, maximum or minimum time to complete the journey), and cost (e.g., pathway that costs the least to user based on a combination of penalty, time, and fuel usage).

The output system 600 is a higher-level concept that includes the user interfaces as one of its key components, along with the backend systems and algorithms that support them. The user interfaces 125 are the specific touchpoints or channels through which the users interact with the output system and the AI-based routing system as a whole.

As shown, a plurality of exemplary data sources 110a-h and various third-party services may be integrated with platform 120 to enable its functionalities and optimize its performance. These data sources and services can be accessed through various application programming interfaces (APIs), data streams, and/or data marketplaces, and integrated into the AI-based platform 120 using data pipelines, data fusion techniques, and interoperability standards. The platform may also ensure the data quality, privacy, security, and compliance with the relevant regulations and licenses. The combination and integration of these diverse data sources and services enable the AI-based platform to provide a comprehensive, dynamic, and personalized view of the urban mobility system, and optimize its performance in terms of emissions, pricing, and routing.

A plurality of satellite instruments 110a can provide satellite data to platform 120. Atmospheric composition data, particularly nitrogen dioxide (NO2) concentrations, from Earth observation satellites such as NASA's Aura, ESA's Sentinel-5P, or JAXA's GOSAT can be sources of input data. Additionally, land use and/or land cover data from satellites like Landsat, MODIS, or Sentinel-2, can be implemented to help characterize the urban environment and its impact on emissions and mobility. Furthermore, ground-based sensor data from air quality monitoring stations measuring pollutants such as NO2, fine particulate matter (PM2.5), CO, and ozone (O3) can be collected by platform 120. Mobile sensor data from vehicles or portable devices equipped with air quality sensors, providing a more granular and dynamic view of the air pollution levels may also be leveraged to provide air quality data.

Weather data 110b may be received, retrieved, or otherwise obtained by platform 120. This may include, but is not limited to, meteorological data, such as temperature, humidity, wind speed and direction, and precipitation, from weather stations, radars, or satellites. Weather forecast data from numerical weather prediction models or machine learning-based models can be obtained, to anticipate the impact of weather on traffic, emissions, and air quality.

Social media platform 110c servers can be interfaced with to collect social media data to gather real-time event and sentiment data from user posts and images, which may be related to traffic conditions, weather conditions, and other relevant information. Crowdsourced data 110d can comprise data aggregated from a plurality of navigation applications (apps) operating on many user devices (e.g., smart phones, tablets, vehicle apps, etc.) to provide, among other things, real-time traffic data. Crowdsourced data can further comprise and/or be sourced from connected vehicles, smartphone sensors, and social media.

Traffic data 110e may comprise traffic flow, speed, and density data from road sensors, such as inductive loops, radar, or cameras, providing real-time information on the traffic conditions. Additionally, floating car data from GPS-equipped vehicles or mobile devices, can provide a more detailed and dynamic view of the traffic patterns and travel times. Traffic data may further include historical traffic data from transportation agencies or data providers, to help model and predict the typical traffic behavior and trends.

Vehicle data 110f may comprise vehicle characteristics data, such as make, model, year, fuel type, and emission standards, from vehicle registration databases or auto manufacturers. Vehicle emissions data from remote sensing devices or on-board diagnostics (OBD) systems, can provide a more accurate and specific view of the vehicle emissions. Furthermore, connected vehicle data from telematics systems or vehicle-to-everything (V2X) communication can be obtained, providing real-time information on the vehicle's location, speed, and performance.

User data 110g may include, but is not limited to: user profile data, such as demographics, preferences, and constraints, from the user's input or social media profiles; user feedback data, such as ratings, comments, or reports, on the recommended routes or the overall system performance; and user activity data, such as search queries, route selections, or navigation behavior, to personalize and improve the user experience.

Road network data 110h can include geographic information system (GIS) data on the road network topology, geometry, and attributes, from transportation agencies or mapping providers. Road infrastructure data, such as traffic signs, signals, and markings, may also be obtained from road asset management systems or computer vision algorithms. Additionally, point of interest (POI) data, such as fuel stations, parking lots, or charging stations, from location-based services or crowdsourcing platforms can be collected by platform 120.

Various third-party services may be integrated into platform 120 to collect input data and provide interoperability between the platform and the services. For instance, mapping and navigation services, such as Google Maps, HERE, or OpenStreetMap, can provide base maps, geocoding, and routing functionalities, while traffic information services, such as Waze, INRIX, or TomTom, may provide real-time traffic updates and incident reports. Parking and charging services, such as ParkWhiz, SpotHero, or PlugShare, can provide information and reservation of parking spots or charging stations. Transit and mobility services, such as Uber, Lyft, or Lime, may provide multimodal transportation options and integrations.

According to some embodiments, platform 120 may further comprise a secure and privacy-preserving data management layer that ensures compliance with data protection regulations and user consent. According to some embodiments, platform 120 may further comprise a performance monitoring and evaluation system that continuously measures and reports on the system's effectiveness in achieving its optimization objectives and user satisfaction. According to some aspects, the system architecture of platform 120 is designed to be modular, scalable, and fault-tolerant, and supports plug-and-play integration of new data sources, models, and algorithms. According to some aspects, platform 120 is configured to manage and orchestrate the data flows and interactions between the system components using a centralized or decentralized architecture.

Figure 2:
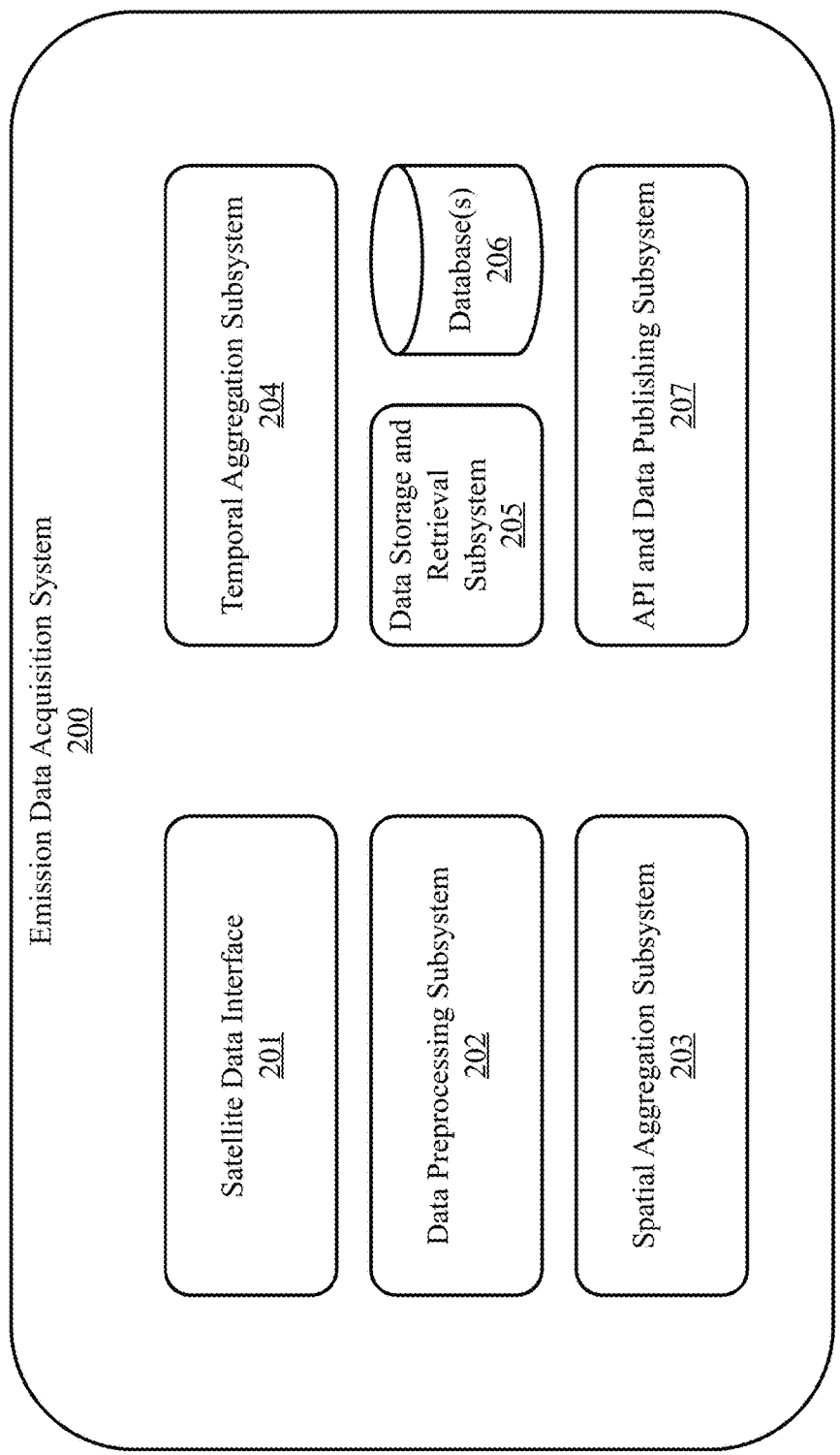
FIG. 2 is a block diagram illustrating an exemplary aspect of the AI-based platform for emissions control, an emission data acquisition system.

FIG. 2 is a block diagram illustrating an exemplary aspect of the AI-based platform for emissions control, an emission data acquisition system 200. According to the aspect, emission data acquisition system 200 is configured to provide the real-time NO2 concentration data that forms the basis for the dynamic road pricing and route optimization. According to the embodiment, the system 200 comprises a satellite data interface 201, a data preprocessing subsystem 202, a spatial aggregation subsystem 203, a temporal aggregation subsystem 204, a data storage and retrieval subsystem 205 that utilizes one or more databases 206 or other data storage systems, and an API and data publishing subsystem 207.

According to the aspect, the satellite data interface 201 is responsible for receiving raw data from the satellite instruments that measure NO2 concentrations. It can support the various, specific data formats and protocols used by the relevant satellite systems, such as, for example, NASA's Aura and ESA's Sentinel-5P. The system may rely on data from satellite instruments designed to measure atmospheric NO2, such as Ozone Monitoring Instrument (OMI) on NASA's Aura satellite or TROPOspheric Monitoring Instrument (TROPOMI) on ESA's Sentinel-5P satellite. Different satellite instruments have different characteristics, such as spatial resolution, temporal coverage, and data quality. The emissions data acquisition system 200 can be designed with the specific capabilities and limitations of the chosen satellite instruments in mind. For example, NASA's OMI instrument has a spatial resolution of 13×24 km at nadir, while ESA's TROPOMI instrument has a resolution of 3.5×7 km. The system can be configured to handle and optimize for these differences. These instruments use spectroscopic techniques to measure NO2 concentrations in the atmosphere. Satellite instruments continuously measure atmospheric NO2 concentrations and transmit this data to ground stations. Accordingly, the satellite data interface 201 may be configured for establishing a connection with these ground stations or data providers to receive the raw NO2 data. According to some implementations, the interface may be designed to handle potential issues like data transmission errors, latency, and intermittent connectivity. It can also be configured with the ability to authenticate and authorize itself to access the satellite data securely.

Satellite data can come in various file formats, each with its own structure and metadata conventions. The emissions data acquisition system is configured to parse and interpret these formats correctly to extract the relevant NO2 information. Common formats for satellite data include HDF5, NetCDF4, and GeoTIFF. The system may use, for example, standard libraries or tools to read and write these formats, such as the Python packages h5py, netCDF4, and GDAL.

According to the aspect, the data preprocessing subsystem 202 performs initial processing and quality control on the raw satellite data. Raw satellite data may contain noise, errors, or gaps due to factors like instrument limitations, atmospheric conditions, or data transmission issues. The subsystem 202 may apply calibration factors, filter out invalid or low-quality measurements, and convert the data into a standardized format for further processing. The raw satellite data may be in various formats, such as HDF (Hierarchical Data Format) or NetCDF (Network Common Data Form). The subsystem 202 is configured to handle these formats and convert them into a standardized internal format for processing. The preprocessing unit may apply algorithms for calibration, filtering, and quality control of the raw data. These may include techniques such as, for example, dark current subtraction, geometric correction (correcting for distortions due to satellite viewing angle) radiometric calibration (converting raw sensor counts to physical units), and cloud masking (removing measurements contaminated by clouds). Preprocessing techniques may further include removing outliers, correcting for instrumental biases, and interpolating missing data points. The choice of algorithms may depend on the specific characteristics of the satellite instrument and the data quality requirements of the application. The subsystem may also maintain metadata about the preprocessing steps applied to each dataset for traceability and quality assurance purposes. The data preprocessing subsystem ensures that the data is cleaned, calibrated, and standardized before further processing.

As the satellite measurements may have a higher spatial resolution than required for the AI-based dynamic pricing, mapping, and emissions control platform 120, the spatial aggregation subsystem 203 aggregates the data to a specified grid size (e.g., 1 km×1 km). Satellite instruments typically measure NO2 concentrations at a high spatial resolution, such as a few kilometers or even less. Spatial aggregation methods are used to estimate NO2 concentrations at a coarser spatial resolution than the original satellite measurements. However, for the purposes of road pricing and routing, a coarser resolution (e.g., 1 km×1 km) may be sufficient. The spatial aggregation subsystem 203 is responsible for aggregating the high-resolution data to the desired grid size. It may use techniques like interpolation or averaging to estimate NO2 concentrations for grid cells with missing or partial data. Simple methods like nearest-neighbor interpolation are fast but may not capture spatial variations well. More advanced methods like kriging or Gaussian process regression can provide better estimates but are computationally more expensive. According to an embodiment, spatial aggregation subsystem 203 may use methods like nearest-neighbor interpolation, bilinear interpolation, or kriging to estimate NO2 concentrations for grid cells with missing or partial data. For example, the choice of aggregation method (e.g., interpolation, averaging) should balance computational efficiency with accuracy. The subsystem 203 may be configured to also handle edge cases, such as grid cells that partially overlap with water bodies or other irrelevant areas.

According to the aspect, the temporal aggregation subsystem 204 aggregates the spatially processed data over a specified time interval (e.g., hourly or daily averages). It maintains a rolling window of recent data to provide the most up-to-date emissions information to the other system components. NO2 concentrations can vary significantly over time, depending on factors such as traffic patterns, weather conditions, and industrial activities. Temporal aggregation subsystem 204 aggregates the spatially processed data over a specified time interval to provide a more stable and representative estimate of NO2 levels. The choice of time interval (e.g., hourly, daily) should balance the need for real-time updates with the potential for short-term fluctuations. The subsystem 204 may also maintain a history of past NO2 levels to enable trend analysis and predictive modeling. Historical NO2 data can be stored in database 206.

According to the aspect, data storage and retrieval subsystem 205 ensures that the processed and aggregated NO2 data is stored in a database 206 or data warehouse for efficient retrieval by other systems/subsystems. This component may also handle data compression, indexing, and backup to ensure data integrity and availability. Data storage and retrieval subsystem 205 may use various databases including, but not limited to, relational databases (e.g., PostgreSQL), NoSQL databases (e.g., MongoDB), or big data platforms (e.g., Hadoop, Spark) depending on the volume, variety, and velocity of the data. The processed and aggregated NO2 data needs to be stored in a way that enables efficient retrieval by other system/subsystem of the AI-based dynamic pricing, mapping, and emissions control platform 120, as well as potential external clients. The subsystem 205 is responsible for designing and managing the database infrastructure for this purpose. For example, the database(s) should be optimized for spatial and temporal queries, such as retrieving NO2 levels for a specific location and time range. It should also ensure data integrity, security, and backup to prevent data loss or unauthorized access.

According to the aspect, the API and data publishing subsystem 207 may be configured to expose the processed NO2 data to other subsystems and external systems via a well-defined API. It may support various data formats (e.g., JSON, CSV, XML) and protocols (e.g., REST, MQTT) to facilitate integration with different clients. API and data publishing subsystem 207 may adhere to standard API specifications like OpenAPI or GraphQL, and use secure communication protocols like HTTPS and authentication and authorization protocols like OAuth2 or JSON Web Token (JWT) to ensure data security and privacy. API standards provide a consistent and interoperable way for different systems to communicate and exchange data. The API can support common data formats and protocols to maximize interoperability.

Figure 3:
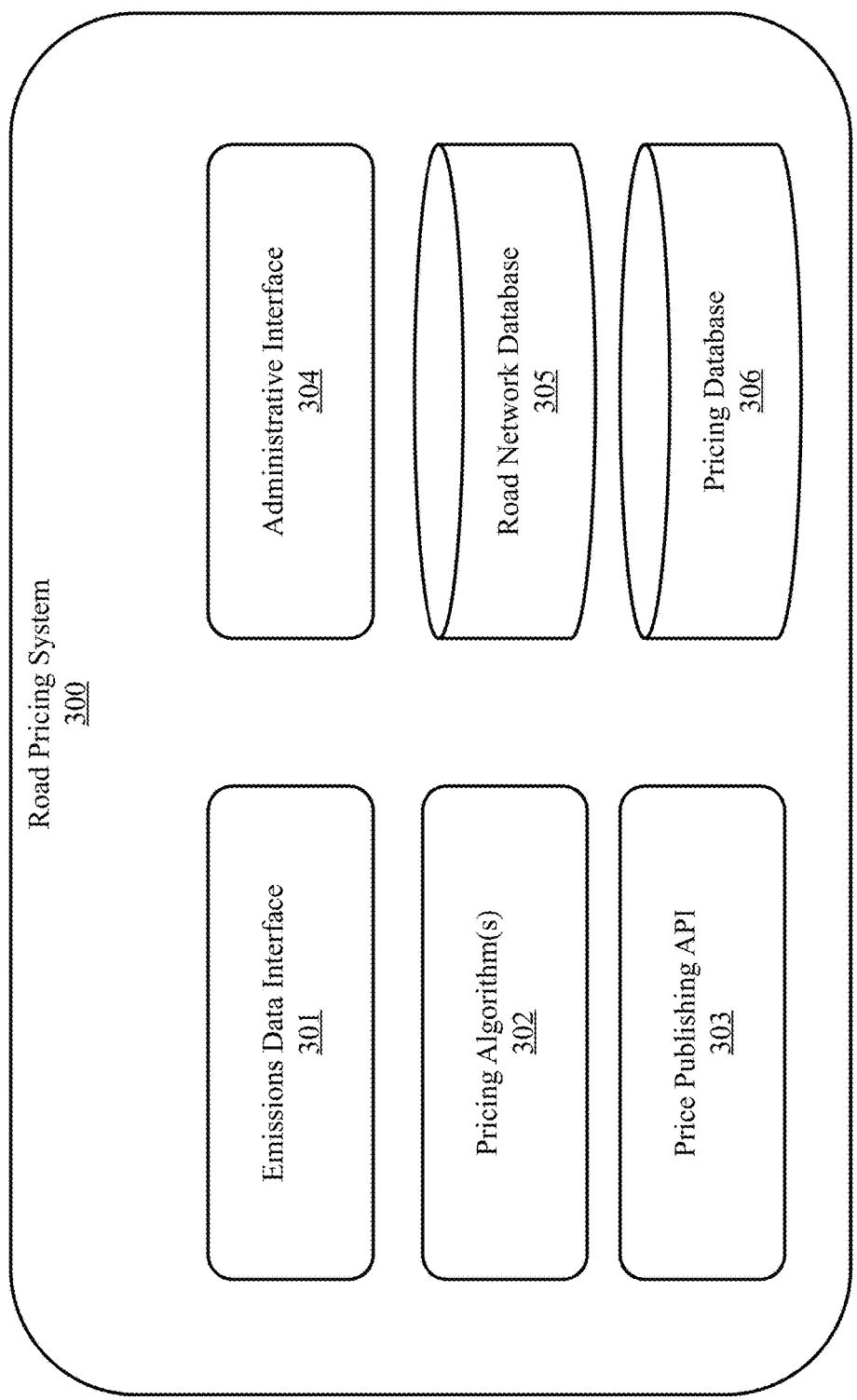
FIG. 3 is a block diagram illustrating an exemplary aspect of the AI-based platform for emissions control, a road pricing system.

FIG. 3 is a block diagram illustrating an exemplary aspect of the AI-based platform for emissions control, a road pricing system 300. According to the aspect, road pricing system 300 is configured to translate the real-time NO2 emission data into dynamic, location-specific prices that can incentivize environmentally friendly routing decisions. According to the embodiment, the system 300 comprises an emissions data interface 301, a road network database 305, one or more pricing algorithms 302, a pricing database 306, a price publishing API 303, and an administration interface 304.

According to the aspect, the emissions data interface 301 is configured to retrieve the latest NO2 emission data from the emission data acquisition system 200. It may periodically poll the emissions API or subscribe to real-time updates using a publish-subscribe pattern. For example, this may comprise making HTTP requests to the emissions API, parsing the response data in JSON or XML format, and handling any errors or exceptions.

According to the aspect, a road network database 305 is present and configured to store information about a road network in a target area, including road segments, lengths, capacities, and speed limits. It may also include historical traffic data and road closure schedules. According to an embodiment, the road network database may model the road network as a graph, with road segments as edges and intersections as nodes. Each edge can have attributes like length, capacity, speed limit, and emissions level. The database may support efficient spatial queries, such as finding all road segments within a given bounding box.

According to the aspect, one or more pricing algorithms 302 may be utilized to apply the dynamic pricing logic to each road segment based on its NO2 emissions level and other relevant factors. It may use, for example, a rule-based approach, a machine learning model, or a combination of both. The pricing algorithm(s) may take into account various factors, such as the NO2 emissions level, the road type and capacity, the time of day, and the historical traffic patterns. It may use techniques like congestion pricing, where the price increases with the level of congestion, or emissions-based pricing, where the price is directly proportional to the NO2 level. The algorithm(s) can be designed to incentivize drivers to take less polluted routes and to spread out traffic to reduce congestion.

According to the aspect, a pricing database 306 is present and configured to store the dynamic prices for each road segment, along with historical pricing data for analytics and auditing purposes. It may be optimized for fast read access by AI-based routing system 500 and other systems/subsystems. According to an embodiment, the pricing database 306 can store the current and historical prices for each road segment, along with metadata such as the timestamp and the pricing algorithm version. It may use a schema that optimizes for fast read access, such as denormalized tables or materialized views. The database may also utilize mechanisms for data backup, recovery, and archiving.

According to the aspect, the price publishing API 303 is configured to expose the current road prices to other systems/subsystems, such as user interface 125 and AI-based routing system 500. It may notify subscribed clients of price updates in real-time. For example, the price publishing API may use a real-time messaging protocol, such as WebSocket or MQTT, to notify subscribed clients of price updates as soon as they are available. This allows the user interface and the routing engine to always display and use the most up-to-date prices.

According to the aspect, the administration interface 304 provides a user interface for system administrators to monitor and manage the road pricing system. It may include features like configuring pricing rules, setting emissions thresholds, and generating pricing reports. The administration interface can have a user-friendly design that allows system administrators to easily monitor and manage the road pricing system. It may use responsive web design principles to ensure accessibility on different devices and screen sizes. The interface may also have appropriate security measures, such as user authentication and authorization, to prevent unauthorized access or manipulation of the pricing data.

Figure 4:
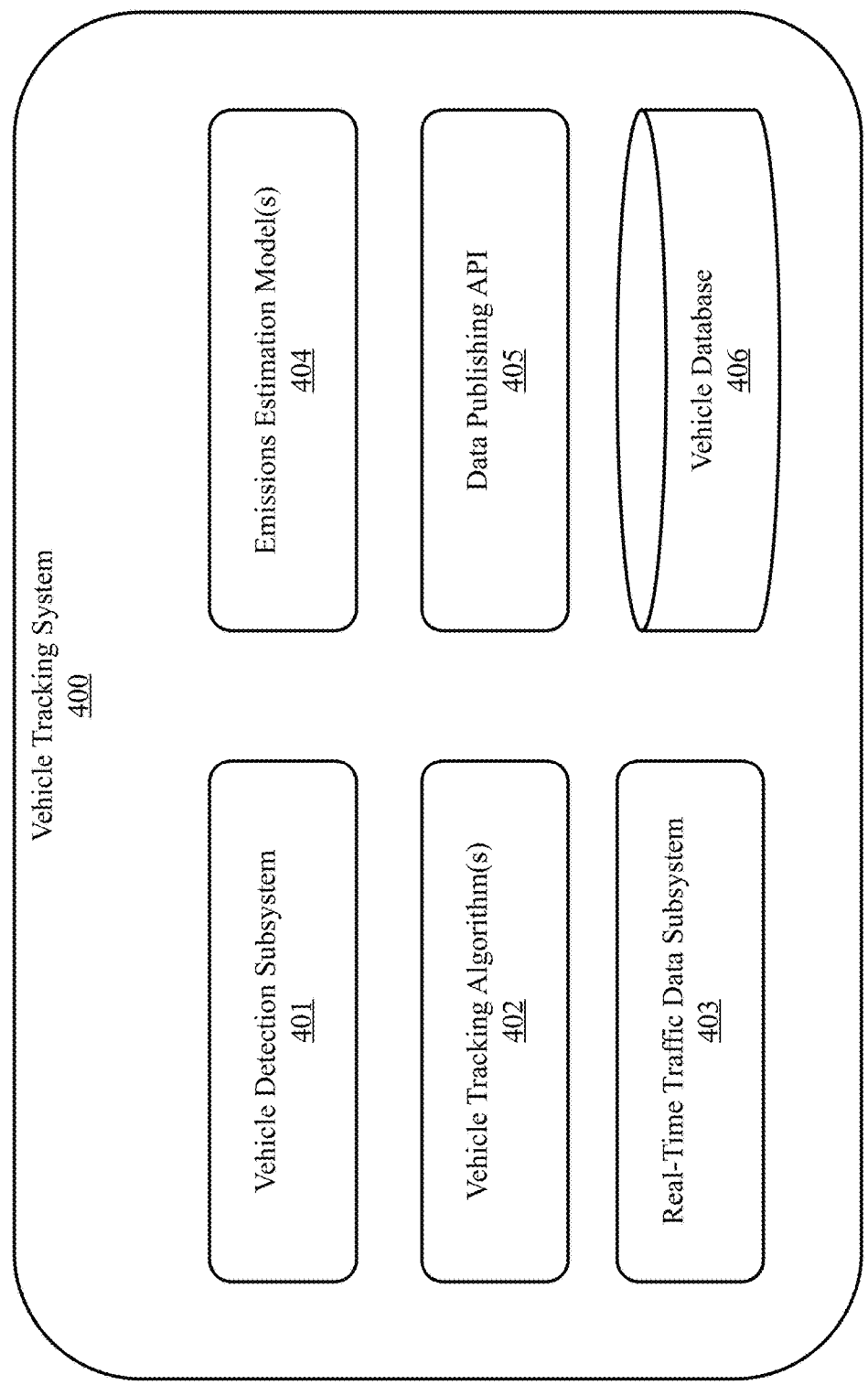
FIG. 4 is a block diagram illustrating an exemplary aspect of the AI-based platform for emissions control, a vehicle tracking system.

FIG. 4 is a block diagram illustrating an exemplary aspect of the AI-based platform for emissions control, a vehicle tracking system 400. According to the aspect, vehicle tracking system 400 is configured to provide real-time information about the location, speed, and emissions profile of individual vehicles in the network. This information is used by AI-based routing system 500 to generate personalized, environmentally optimized routes for each vehicle. According to the embodiment, the system 400 comprises a vehicle detection subsystem 401, one or more vehicle tracking algorithms 402, a real-time traffic data subsystem 403, one or more emissions estimation models 404, a data publishing API 405, and a vehicle database 406.

According to the aspect, the vehicle detection subsystem 401 can be configured to use various technologies to perform vehicle detection such as automatic number plate recognition (ANPR) cameras, radio-frequency identification (RFID) readers, and/or Global Positioning System (GPS) trackers to detect and identify vehicles entering and exiting the road network. It may be deployed at strategic locations such as intersections, on-ramps, or toll booths. ANPR cameras capture images of vehicle license plates and use optical character recognition (OCR) algorithms to extract the plate number. The accuracy of ANPR can be affected by factors such as lighting conditions, camera angles, and plate designs. Vehicle tracking system 401 may utilize high-quality cameras and advanced OCR algorithms to ensure reliable plate recognition. For instance, machine learning can be used to perform image recognition (e.g., picture to text) and then using the textual value to ping/query a vehicle inquiry system.

According to the aspect, a vehicle database 406 stores information about each vehicle, including, but not limited to, its license plate number, make and model, fuel type, emissions rating, and owner details. It may be integrated with external databases such as the registration records from the Department of Motor Vehicles or other similar governmental or regulatory entities which may exist in a given country/locality.

According to the aspect, vehicle tracking system 400 may implement one or more vehicle tracking algorithms 402 which process the raw data from the vehicle detection subsystem to track the movement of each vehicle through the road network. It may use techniques such as map matching, Kalman filtering, or particle filtering to estimate the vehicle's location, speed, and trajectory. Map matching is the process of aligning the raw vehicle location data (e.g., GPS coordinates) with the digital road network map. It involves finding the most likely path that the vehicle has traveled based on the sequence of location points. The vehicle tracking system can use efficient map matching algorithms that can handle noisy and sparse location data, such as, for example, the Hidden Markov Model or the ST-Matching algorithm. Kalman filtering is a technique for estimating the state of a dynamic system (e.g., a vehicle's position and speed) based on noisy sensor measurements. It works by recursively updating the state estimate based on the observed data and the system model. In an embodiment, vehicle tracking system 400 can use Kalman filters to smooth out the raw vehicle trajectories and to predict the vehicle's future position for real-time tracking.

According to the aspect, the real-time traffic data subsystem 403 can be configured to aggregate the individual vehicle trajectories to generate real-time traffic data for each road segment, such as traffic volume, average speed, and congestion level. It may also integrate with external traffic data sources such as loop detectors, traffic cameras, social media platforms, or crowdsourced data from navigation apps (e.g., Google Maps, Waze, Apple Maps, etc.). Inductive loop detectors are the most common type of traffic sensors, which are embedded in the pavement of roadways. They work by detecting changes in the magnetic field caused by the metal in passing vehicles. The data from multiple loop detectors can be used to estimate traffic volume, speed, and occupancy for each lane. Magnetic loop detectors are similar to inductive loops but use a different technology to detect vehicles. They measure the change in the Earth's magnetic field caused by the presence of a vehicle, which allows them to detect stationary vehicles as well as moving ones. Microloop detectors are a newer type of loop detector that uses wireless technology to transmit the traffic data to a roadside unit. They are easier to install and maintain than traditional loops, as they don't require direct connection to the traffic controller cabinet. Closed-circuit television (CCTV) cameras are widely used for traffic monitoring and incident detection. They provide real-time video footage of the roadway, which can be analyzed by human operators or computer vision algorithms to detect traffic patterns, incidents, or congestion. Video analytics cameras are advanced traffic cameras that have built-in video analytics capabilities, such as vehicle tracking, speed estimation, or license plate recognition. They can provide more detailed and automated traffic data than traditional CCTV cameras. Thermal cameras use infrared technology to detect the heat signatures of vehicles, even in low-light or nighttime conditions. They can provide accurate counts of vehicles and pedestrians, as well as detect unusual events such as wrong-way driving or stopped vehicles. Additionally, many modern vehicles are equipped with sensors and communication devices that can transmit real-time data about their location, speed, and driving behavior to the cloud. This data can be aggregated and anonymized to provide a comprehensive view of traffic conditions across the road network. In addition to GPS data, smartphones have a variety of sensors, such as accelerometers, gyroscopes, and barometers, that can provide information about the user's movement and environment. This data can be used to detect driving events, such as hard braking or sharp turns, and to infer traffic conditions based on the collective behavior of many users. Social media platforms, such as Twitter or Instagram, can be a valuable source of real-time traffic information, especially for incidents or events that are not captured by traditional sensors. In an embodiment, vehicle tracking system 400 may connect with social media servers and use natural language processing and machine learning techniques to extract relevant traffic data from social media posts and images.

According to the aspect, one or more emissions estimation models 404 may be used to estimate the real-time emissions of each vehicle based on its speed, acceleration, and emissions rating. It may use models such as the Motor Vehicle Emission Simulator (MOVES) or the Computer Program to Calculate Emissions from Road Transport (COPERT) model. The MOVES model is a comprehensive emissions modeling system developed by the US Environmental Protection Agency (EPA). It estimates vehicle emissions based on various input parameters, such as vehicle type, age, speed, and road grade. The vehicle tracking system can use the MOVES model to estimate the real-time emissions of each vehicle based on its speed and acceleration profile.

Similarly, the COPERT model is a widely used tool for estimating emissions from road transport in Europe. It was developed by the European Environment Agency (EEA) in cooperation with the European Commission's Joint Research Centre (JRC) and is used by many European countries for official reporting of road transport emissions. COPERT uses a methodology based on the EMEP/EEA air pollutant emission inventory guidebook, which provides guidance on estimating emissions from various sources, including road transport. The model calculates emissions of a wide range of pollutants, including greenhouse gases (CO2, CH4, N2O), air pollutants (CO, NOx, VOC, PM), and toxic substances (PAHs, POPs, heavy metals). The model requires detailed input data on the vehicle fleet (e.g., vehicle numbers, types, ages, and emission standards), traffic activity (e.g., annual mileage, average speed, road types), and fuel consumption (e.g., fuel types, quantities, properties). This data is typically obtained from national statistics, vehicle registration databases, and traffic surveys. COPERT uses a comprehensive database of emission factors, which specify the amount of pollutants emitted per unit of activity (e.g., grams per kilometer) for different vehicle categories and emission standards. The emission factors are based on extensive laboratory and real-world measurements and are regularly updated to reflect the latest technologies and regulations. COPERT takes into account the effects of various emission control technologies, such as catalytic converters, particulate filters, and exhaust gas recirculation (EGR), on the emission performance of vehicles. The model applies different emission factors for vehicles with and without these technologies, based on their emission standards and deterioration over time. The model also considers the effects of fuel properties, such as sulfur content, aromatic content, and biodiesel blend, on the emissions of certain pollutants. For example, higher sulfur content in diesel fuel can lead to higher particulate matter emissions, while higher biodiesel blends can reduce CO2 emissions but increase NOx emissions.

The COPERT model is continuously updated and improved to reflect the latest scientific knowledge and policy developments in the field of road transport emissions. The current version, COPERT 5, includes new features such as the ability to model emissions from plug-in hybrid and electric vehicles, as well as emissions from non-exhaust sources such as tire and brake wear. In the context of the AI-based dynamic pricing, mapping, and emissions control platform 120, the COPERT model can be a valuable tool for estimating the real-time emissions of individual vehicles based on their speed, acceleration, and other parameters. The model's emission factors and algorithms can be integrated into the vehicle tracking system to provide accurate and consistent emissions data for route optimization and environmental assessment.

According to the aspect, a data publishing API 405 is present and configured to expose the real-time vehicle and traffic data to other systems/subsystems, such as the routing engine and the user interface. It may use protocols such as WebSocket, MQTT, or REST API to stream the data in real-time. For instance, WebSocket is a communication protocol that enables real-time, bidirectional data transfer between a client and a server over a single TCP connection. It is well-suited for streaming high-frequency data such as vehicle positions and traffic updates. The vehicle tracking system can use WebSocket to publish the real-time data to the other systems and to handle client subscriptions and authentication.

Figure 5:
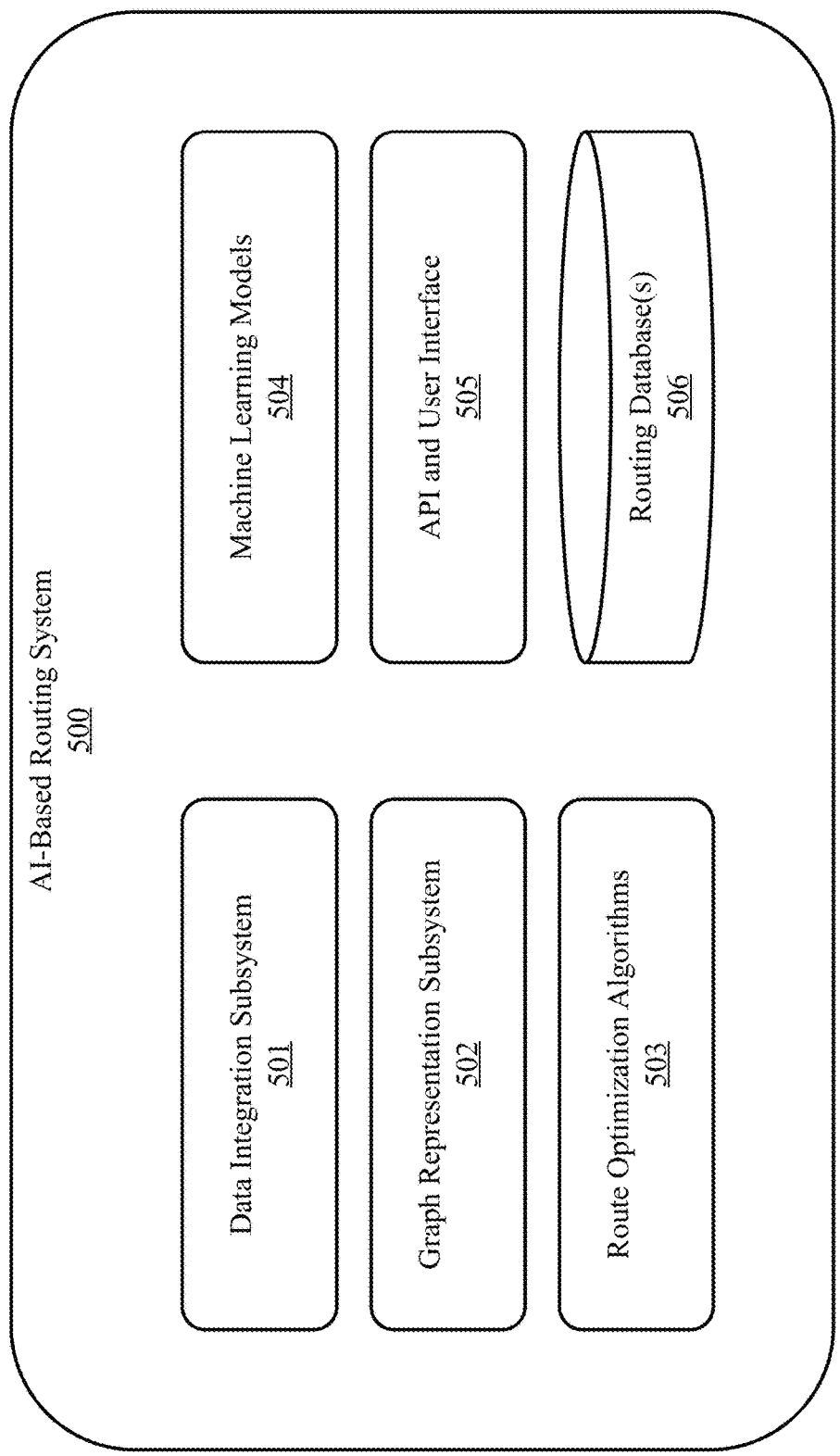
FIG. 5 is a block diagram illustrating an exemplary aspect of the AI-based platform for emissions control, an AI-based routing system.

FIG. 5 is a block diagram illustrating an exemplary aspect of the AI-based platform for emissions control, an AI-based routing system 500. According to the aspect, AI-based routing system 500 is configured to generates personalized, environmentally optimized routes for individual vehicles based on real-time traffic, emissions, and pricing data. According to the embodiment, the system 500 comprises a data integration subsystem 501, a graph representation subsystem 502, one or more route optimization algorithms 503, various machine learning models 504, an API and user interface 505, and a routing database 506.

According to the aspect, the data integration subsystem 501 collects and preprocesses the real-time data from various sources, such as the emissions data acquisition system 200, the road pricing system 300, and the vehicle tracking system 400. It also integrates static data, such as the road network topology, speed limits, and turn restrictions, from geographic information systems (GIS) databases. The data integration layer uses various techniques, such as REST APIs, message queues, and data streams, to collect and harmonize the heterogeneous data from the different modules. It may apply data cleaning, transformation, and aggregation methods to ensure the quality and consistency of the data.

According to the aspect, the graph representation subsystem 502 may be configured to model a road network as a directed graph, where nodes represent intersections or decision points, and edges represent road segments. Each edge is associated with a set of attributes, such as length, speed, emissions, and price, which are dynamically updated based on the real-time data. In some implementations, the routing system uses efficient graph traversal and shortest path algorithms, such as Dijkstra's algorithm, A* search, or contraction hierarchies, to find the optimal routes in real-time. These algorithms are adapted to handle the dynamic and multi-objective nature of the problem, by incorporating time-dependent and stochastic edge weights.

According to the aspect, one or more advanced route optimization algorithms 503 may be applies to find the best route between a given origin and destination, based on the user's preferences and constraints. The algorithms may consider multiple objectives, such as minimizing travel time, emissions, and cost, and can handle complex trade-offs and uncertainties. In an embodiment, the route optimization problem is formulated as a multi-objective optimization model, which seeks to minimize a weighted sum of the travel time, emissions, and cost, subject to various constraints, such as road capacity, speed limits, and user preferences. The model may be solved, for example, using exact or heuristic methods, such as integer programming, genetic algorithms, or simulated annealing.

According to an embodiment, platform 120 can perform route optimization using a genetic algorithm economic and environmental dispatch (GA-EED) tool to identity one or more optimized pathways, based on multiple preferences and constraints. The GA-EED tool is an AI tool that uses a genetic algorithm approach to optimize the dispatch of energy resources considering both economic and environmental factors. Genetic algorithms are a class of optimization algorithms inspired by the principles of natural selection and genetics, which evolve a population of candidate solutions over multiple generations to find the optimal solution. In the context of the AI-based routing system, the GA-EED tool can be adapted to optimize the selection of routes considering various economic and environmental criteria, such as: minimizing fuel consumption or energy use of vehicles; minimizing emissions or air pollution along the route; minimizing travel time or distance; minimizing road congestion or traffic delays; and balancing the trade-offs between these different criteria based on user preferences and system goals. According to an aspect, the multi-objective optimization algorithm is based on a metaheuristic such as genetic algorithms, particle swarm optimization, or simulated annealing, and is adapted to handle dynamic and stochastic problem instances For example, the GA-EED tool can work by encoding potential routes as "chromosomes" and applying genetic operators such as selection, crossover, and mutation to evolve and improve the routes over successive generations. For example: selection can be based on tournament or roulette wheel methods to prefer fitter routes; crossover may comprise swapping segments of parent routes to create offspring routes; and mutation may comprise randomly altering nodes or attributes of a route. In an embodiment, the route can be encoded as a sequence of nodes or waypoints that the vehicle must pass through, along with any relevant attributes like travel mode, speed, or charging/fueling stops.

The fitness of each route can be evaluated based on a weighted combination of the economic and environmental criteria, and the best routes would be selected and reproduced in each generation. Exemplary fitness optimization objectives can include, but are not limited to: total travel time, considering factors like road type, speed limits, traffic congestion, and weather conditions; energy consumption, based on the vehicle type, speed profile, road grade, and auxiliary loads; emissions, which may calculated using models like COPERT that estimate pollutant emissions based on vehicle type, speed, and driving conditions; and route penalties, based on factors like road pricing, safety risk, environmental impact, and user preferences, similar to the penalty matrix in the power system application. AI-based routing system 500 can generate optimal routes that balance multiple objectives while respecting various constraints and system conditions. This can help reduce travel times, energy consumption, emissions, and costs for both individual users and the overall transportation system.

The route optimization must respect various constraints, such as: road network topology and connectivity; vehicle range and refueling/recharging requirements; traffic rules and turn restrictions; and user-specified origin, destination, waypoints, and time windows. Constraint violations can be handled by penalty functions (e.g., penalty matrix) that reduce the fitness of infeasible routes, or by repair mechanisms that modify routes to restore feasibility. The route optimization can incorporate a penalty matrix to discourage the use of certain roads or areas based on factors like congestion, emissions, safety, or environmental impact. The penalty matrix can be dynamically updated based on real-time data from sensors, satellites, weather stations, mobile device sensors, onboard vehicle sensors, social media, or traffic management systems.

The GA-EED tool iterates the process of fitness evaluation, selection, crossover, and mutation over multiple generations until a termination criterion is met, such as, for example, a maximum number of generations or a convergence threshold.

The GA-EED tool can be integrated into the routing system of the AI-based dynamic pricing, mapping, and emissions control platform 120, and can be run in real-time or offline depending on the computational resources and data availability. The specific implementation details of the GA-EED tool, such as the chromosome encoding, fitness evaluation, and genetic operator settings, may be adapted and fine-tuned for the specific routing problem and data sources used by the system.

In an embodiment, the multi-objective optimization algorithm comprises a GA-EED tool that optimizes the selection of routes considering various economic and environmental criteria, such as minimizing fuel consumption, emissions, travel time, and road congestion, while balancing the trade-offs between these criteria based on user preferences and system goals.

In an embodiment, the GA-EED tool for vehicle route optimization may be integrated with other modules of a Co-ordinated and Centralized Energy Management System (ConCEMS) that integrates supply-side, demand-side and transmission line management systems for optimal grid operation. The optimal routes generated by the GA-EED tool can be integrated with the other modules of ConCEMS, such as: a home energy management system (HEMS) module can use the estimated travel times and energy consumption to optimize the scheduling of home loads and EV charging; a supply-side energy management system (SSEMS) module can use the estimated power demand of EV charging to optimize the dispatch of generators and renewable sources; and a transmission line management system (TLMS) module can use the estimated traffic flows to calculate the dynamic line ratings and check for any transmission bottlenecks.

With respect to Carbon-Adjust, platform 120 can integrate with an improved comfort biased smart home load manager (iCBSHLM). The iCBSHLM is a tool for managing the energy consumption of smart homes while considering the comfort preferences of the occupants. It uses a combination of optimization algorithms and machine learning techniques to schedule and control the operation of various home appliances and systems, such as HVAC, lighting, and electric vehicles, to minimize energy costs and emissions while maintaining a satisfactory level of comfort for the occupants. In the context of the AI-based routing system, the iCBSHLM can be used to optimize the charging and discharging of electric vehicles (EVs) at home, considering the user's comfort preferences, energy prices, and emissions intensity of the grid. For instance, the iCBSHLM can be integrated into the user interface system 125 of the AI-based platform 120, and can communicate with the EV's battery management system and the home energy management system to control the charging and discharging schedule. The iCBSHLM can function by learning the user's comfort preferences and energy consumption patterns over time, and using this knowledge to optimize the EV charging schedule to minimize costs and emissions while ensuring that the EV has sufficient charge for the user's planned trips. The iCBSHLM can also be used to provide personalized recommendations and incentives to the user for optimizing their EV usage and home energy consumption, based on their comfort preferences and the system's goals for reducing emissions and congestion.

According to an embodiment, platform 120 integrates with an iCBSHLM to optimize the charging and discharging of EVs at home, considering the user's comfort preferences, energy prices, and emissions intensity of the grid, and provides personalized recommendations and incentives to the user for optimizing their EV usage and home energy consumption, thereby adapting the user and vehicle behavior models based on the received user feedback.

The GA-EED tool and the iCBSHLM are two examples of advanced AI techniques that can be used in some embodiments to optimize the economic and environmental performance of the AI-based routing system 500, by considering the complex trade-offs and interactions between different criteria and stakeholders.

According to the aspect, one or more machine learning models 504 may be used to predict the future traffic and emissions conditions based on historical patterns and real-time data. The models can learn from the feedback and behavior of the users to continuously improve the accuracy and relevance of the route recommendations. In some embodiments, the routing system uses various machine learning techniques, such as deep neural networks, reinforcement learning, and probabilistic graphical models, to predict the future traffic and emissions conditions based on historical and real-time data. The models can be trained on large datasets of traffic and emissions measurements, and can be continuously updated and refined based on the feedback and behavior of the users.

The AI-based routing system 500 can utilize various machine learning models to predict traffic conditions, emissions, and other relevant factors for optimizing routes. With respect to traffic speed and congestion prediction the system may implement long short-term memory (LSTM) neural networks, convolutional neural networks (CNN) and/or gradient boosting machines (GBM). LSTM is a type of recurrent neural network (RNN) that can learn long-term dependencies in sequential data. It can be used to predict future traffic speeds or congestion levels based on historical patterns and real-time data, such as traffic flow, speed, and density measurements from sensors or floating car data. CNNs are commonly used for image recognition tasks, but they can also be applied to traffic speed prediction by treating the road network as a grid-like image. The CNN can learn spatial and temporal patterns in the traffic data and predict the speed or congestion levels for each road segment. GBM is an ensemble learning method that combines multiple weak prediction models (e.g., decision trees) to create a strong model. It can be used to predict traffic speeds or congestion levels based on various features, such as time of day, day of week, weather conditions, and road characteristics.

With respect to emissions predictions the system may implement multiple linear regression (MLR), random forest (RF), and/or support vector regression (SVR) models. MLR is a simple but effective method for modeling the relationship between a dependent variable (e.g., emissions) and multiple independent variables (e.g., traffic speed, acceleration, road grade). It can be used to estimate the emissions of individual vehicles based on their real-time driving parameters and the COPERT or other emission factors. RF is an ensemble learning method that builds multiple decision trees on random subsets of the data and features, and combines their predictions to reduce overfitting and improve accuracy. It can be used to predict vehicle emissions based on various categorical and continuous features, such as vehicle type, fuel type, speed, and acceleration. SVR is a regression version of the support vector machine (SVM) algorithm, which finds a hyperplane that maximizes the margin between the data points and the hyperplane. It can be used to predict vehicle emissions based on multiple features, while handling non-linear relationships and outliers in the data.

With respect to travel time prediction the system may implement Kalman filtering, Bayesian networks, and/or deep belief networks (DBN). As previously discussed, Kalman filtering is a recursive algorithm that estimates the state of a dynamic system (e.g., travel time) based on noisy measurements and a transition model. It can be used to predict the travel time of a route based on real-time traffic data and historical patterns, while adapting to the changing traffic conditions and uncertainties. Bayesian networks are probabilistic graphical models that represent the conditional dependencies between random variables (e.g., travel time, traffic flow, incidents). They can be used to predict the travel time of a route based on the observed or inferred values of the relevant variables, and update the predictions as new evidence becomes available. DBNs are generative neural networks that learn a hierarchical representation of the input data by stacking multiple layers of Restricted Boltzmann Machines (RBM). They can be used to predict the travel time of a route based on multiple features, such as traffic speed, congestion, incidents, and weather, while capturing the complex and non-linear relationships between the variables.

These are just a few examples of the many machine learning models and techniques that can be used for traffic, emissions, and travel time prediction in the routing system. The choice of the appropriate model depends on various factors, such as the type and quality of the data, the computational resources and constraints, the desired accuracy and interpretability, and the specific requirements and objectives of the routing problem. Moreover, the models may be trained, validated, and tested on representative and diverse datasets, and continuously updated and refined based on the feedback and performance metrics from the real-world deployment. The routing system may also incorporate a machine learning engine 700 which can provide techniques for data preprocessing, feature selection, hyperparameter tuning, and model ensemble to improve the robustness and generalization of the predictions.

The routing system 500 can provide real-time navigation guidance to the users, by continuously monitoring their position and speed, and updating the route recommendations based on the changing traffic and emissions conditions. It can use map matching and dead reckoning (deduced reckoning) techniques to accurately locate the vehicles on the road network, and provide turn-by-turn instructions and alerts.

According to the aspect, the optimized routes are exposed to the users through a web or mobile application interface 505, which allows them to enter their destination, preferences, and constraints, and receive turn-by-turn navigation guidance. The routing system can also provide an API for integration with third-party applications and services.

API and user interface 505 may provide a portal through which governmental or local authorities can input a weight matrix for all concerned roads across a geographical entity. By feeding their weight matrix into the system it means they provide a set of numerical values or weights that represent the relative importance or priority of different factors or criteria for each road segment in the given area. The weight matrix may include factors such as (but not limited to): environmental impact wherein the weight assigned is to the environmental impact of traffic on each road, based on factors such as air quality, noise pollution, or greenhouse gas emissions; road conditions wherein the weight assigned is to the physical condition of each road, based on factors such as pavement quality, lane width, or presence of potholes or cracks; traffic volume wherein the weight is assigned to the typical traffic volume on each road, based on factors such as average daily traffic, peak hour traffic, or percentage of heavy vehicles; safety wherein the weight is assigned to the safety risk of each road, based on factors such as accident history, speed limit, or presence of pedestrians or cyclists; and strategic importance wherein the weight is assigned to the strategic importance of each road, based on factors such as connectivity to key destinations, emergency routes, or evacuation paths.

The weight matrix is essentially a way for the authorities to encode their priorities, policies, and local knowledge into a quantitative format that can be used by AI-based routing system 500 to optimize the routes and pricing based on these factors. For example, if the authorities assign a high weight to the environmental impact factor for a certain road, the routing system will prioritize reducing emissions and congestion on that road, possibly by recommending alternative routes or modes of transportation to the users. The use of a weight matrix allows the authorities to have a direct and transparent influence on the behavior and outcomes of the AI-based routing system, while still leveraging the power and efficiency of AI to optimize the routes and pricing based on multiple criteria and constraints. It also enables a collaborative and iterative approach to managing the urban mobility system, where the authorities and the AI system can learn from each other and adapt to the changing needs and preferences of the users and the environment.

AI-based routing system 500 can be configured to generate, compute, derive, infer, or otherwise calculate a penalty matrix as a way to assign a numerical cost or penalty to each road segment based on various factors that discourage or penalize the use of that road by the vehicles. According to an embodiment, the penalty matrix can be used by the one or more routing algorithms 503 to calculate the optimal routes that minimize the total penalty or cost while satisfying the given constraints and preferences. The penalty matrix can include factors such as (but not limited to): environmental impact wherein the penalty is assigned to each road based on its environmental impact, such as the level of air pollution, noise, or greenhouse gas emissions caused by the traffic on that road; congestion wherein the penalty is assigned to each road based on its level of congestion, such as the average delay, queue length, or speed reduction caused by the traffic on that road; road pricing wherein the penalty is assigned to each road based on its pricing scheme, such as the toll fee, congestion charge, or dynamic pricing applied to the vehicles using that road; safety risk wherein the penalty is assigned to each road based on its safety risk, such as the frequency or severity of accidents, violations, or conflicts involving the vehicles or pedestrians on that road; and user preferences wherein the penalty is assigned to each road based on the user's preferences or constraints, such as the avoidance of certain areas, road types, or traffic conditions specified by the user.

The weight matrix provided by the governmental or local authorities can play a role in determining the values and priorities of the penalty matrix used by the routing system. The weight matrix essentially defines the relative importance or contribution of each factor in the overall penalty calculation. For example, if the weight matrix assigns a high weight to the environmental impact factor, the routing system will prioritize the roads with lower emissions or pollution levels in the penalty matrix, and will recommend the routes that minimize the environmental impact to the users.

The use of a penalty matrix enables the routing system to balance multiple and potentially conflicting objectives and criteria in a quantitative and transparent way, while respecting the priorities and preferences of the authorities and users. It also enables a dynamic and adaptive approach to route optimization, where the penalties can change based on the current conditions and goals of the system, such as reducing emissions during peak hours or promoting safety during adverse weather. The integration of the weight matrix into the penalty matrix ensures that the routing system aligns with the policies and values of the authorities, while leveraging the power and flexibility of AI to find the best solutions for the users and the environment. It also fosters a collaborative and iterative relationship between the authorities and the AI system, where both parties can learn from each other and improve the performance and outcomes of the AI-based dynamic pricing, mapping, and emissions control platform 120 over time.

According to the aspect, one or more routing databases 506 are present and configured to store information to support AI-based routing system functionality. This can include a plurality of weight matrices obtained from governmental or local authorities, a plurality of penalty matrices obtained for a plurality of road segments, and may further comprise various route optimization algorithms and ML models which may be implemented by routing system 500. Additionally, routing database 506 may store computed individual and overall penalty scores which may be obtained by analyzing the stored weight and penalty matrices.

Figure 6:
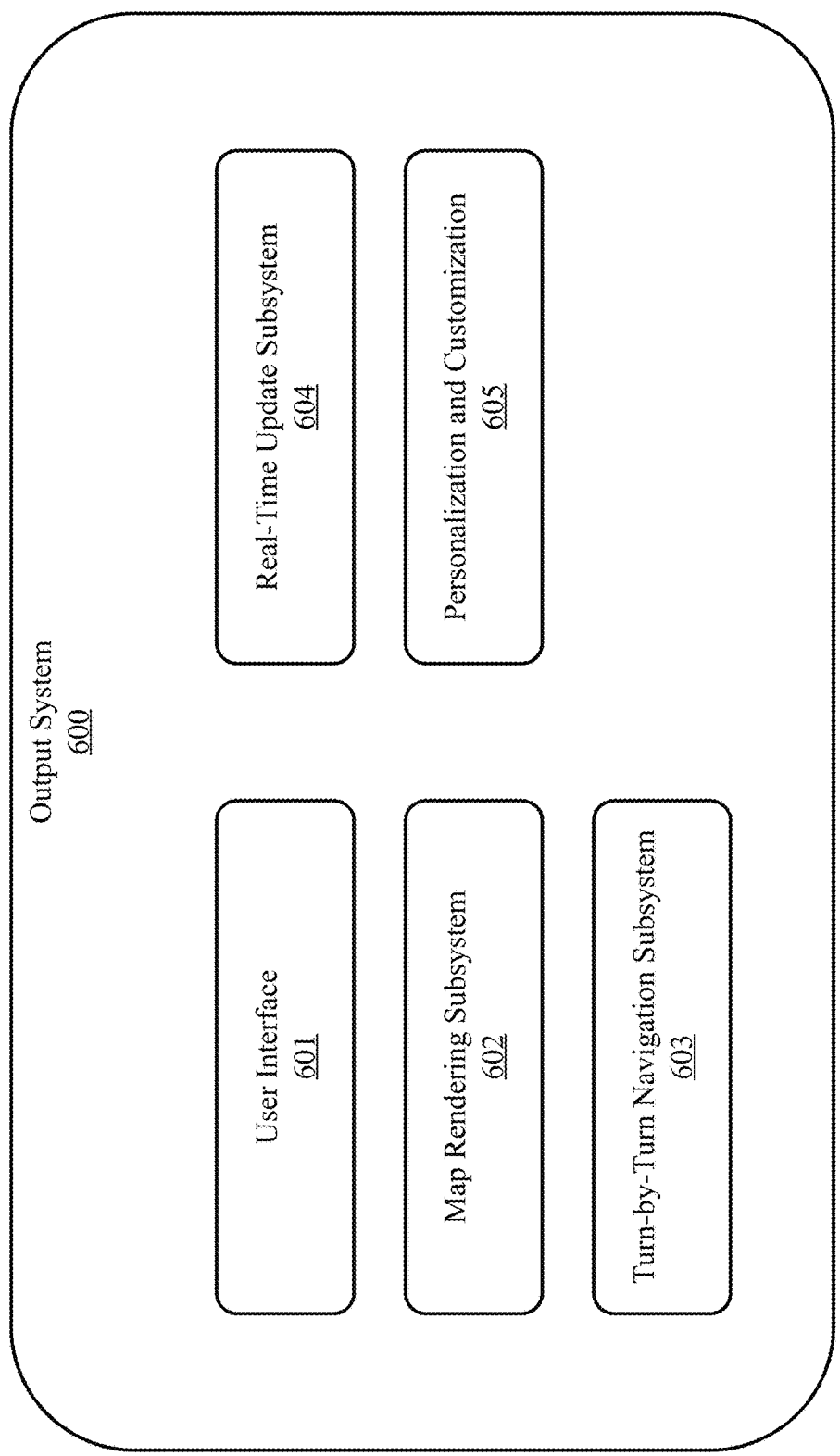
FIG. 6 is a block diagram illustrating an exemplary aspect of the AI-based platform for emissions control, an output system.

FIG. 6 is a block diagram illustrating an exemplary aspect of the AI-based platform for emissions control, an output system 600. According to the aspect, output system 600 is configured for delivering the optimized routes and navigation guidance to the users in a clear, timely, and actionable manner. It is the interface between the AI-based routing system 500 and the end-users, and plays a role in the overall user experience and satisfaction. According to the embodiment, the output system 600 comprises a user interface 601, a map rendering subsystem 602, a turn-by-turn navigation subsystem 603, a real-time update subsystem 604, and various features for personalization and customization 605.

According to the aspect, the user interface 601 may provide a graphical user interface (GUI) for the users to interact with the routing system, input their preferences and constraints, and view the recommended routes and navigation guidance. The user interface can be a web-based or mobile application, or an in-vehicle navigation system, depending on the platform and device. For instance, the user interface should be designed with user-centered principles, such as simplicity, consistency, and responsiveness. It should provide a clear and intuitive workflow for inputting the origin, destination, and preferences, and displaying the recommended routes and alternatives. It may also adapt to different screen sizes, resolutions, and input methods, and provide accessibility features for users with disabilities.

According to the aspect, the map rendering subsystem 602 component is responsible for rendering the map and visualizing the recommended routes, traffic conditions, and points of interest. It may use a geographic information system (GIS) database to store and retrieve the map data, and applies cartographic techniques to style and label the map features. For example, map rendering subsystem 602 can use various technologies, such as WebGL, OpenGL, or DirectX, to render the map and route visualizations in 2D or 3D. It may optimize the map data storage, retrieval, and caching to ensure fast and smooth rendering, even for large and complex road networks. It may also apply cartographic best practices, such as color schemes, symbology, and labeling, to enhance the readability and aesthetics of the map.

According to the aspect, the turn-by-turn navigation subsystem 603 generates the turn-by-turn navigation instructions for the recommended routes, based on the road network topology, traffic rules, and user preferences. It may use natural language generation techniques to provide clear and concise verbal or written instructions, and synchronizes them with the map display and the user's location. In an embodiment, the turn-by-turn navigation component can use rule-based or machine learning-based techniques to generate the navigation instructions in natural language. It may consider factors such as the road type, speed limit, landmarks, and user familiarity to provide clear and relevant instructions. It can also handle edge cases, such as roundabouts, U-turns, or ambiguous intersections, and provide additional guidance or warnings when needed.

According to the aspect, the real-time update subsystem 604 is configured to receive real-time updates from the routing system and other data sources, such as traffic incidents, road closures, or weather alerts, and notify the users of any changes or disruptions to their routes. It may also allow the users to report feedback or incidents, and integrate them into the routing system for continuous improvement. For example, real-time update subsystem 604 can use various communication protocols, such as WebSocket, MQTT, or SSE, to receive and send real-time data between the client and server. It can handle the data volume, latency, and reliability challenges of real-time communication, and provide graceful degradation or fallback mechanisms in case of network or server failures.

As shown, the system provides methods and techniques that allow the users to personalize and customize 605 the output of the routing system, based on their preferences, history, and context. It can learn from the user's behavior and feedback to adapt the route recommendations, user interface, and communication style to their individual needs and expectations. In an embodiment, the personalization and customization component 605 can use various machine learning algorithms, such as collaborative filtering, content-based filtering, or hybrid approaches, to learn from the user's preferences and behavior. It can collect implicit or explicit feedback from the user's interactions with the system, such as route selections, ratings, or comments, and use them to build user profiles and recommendation models. In some embodiments, the interactive user interface includes features for personalization, gamification, and incentivization to encourage user engagement and behavior change.

Figure 7:
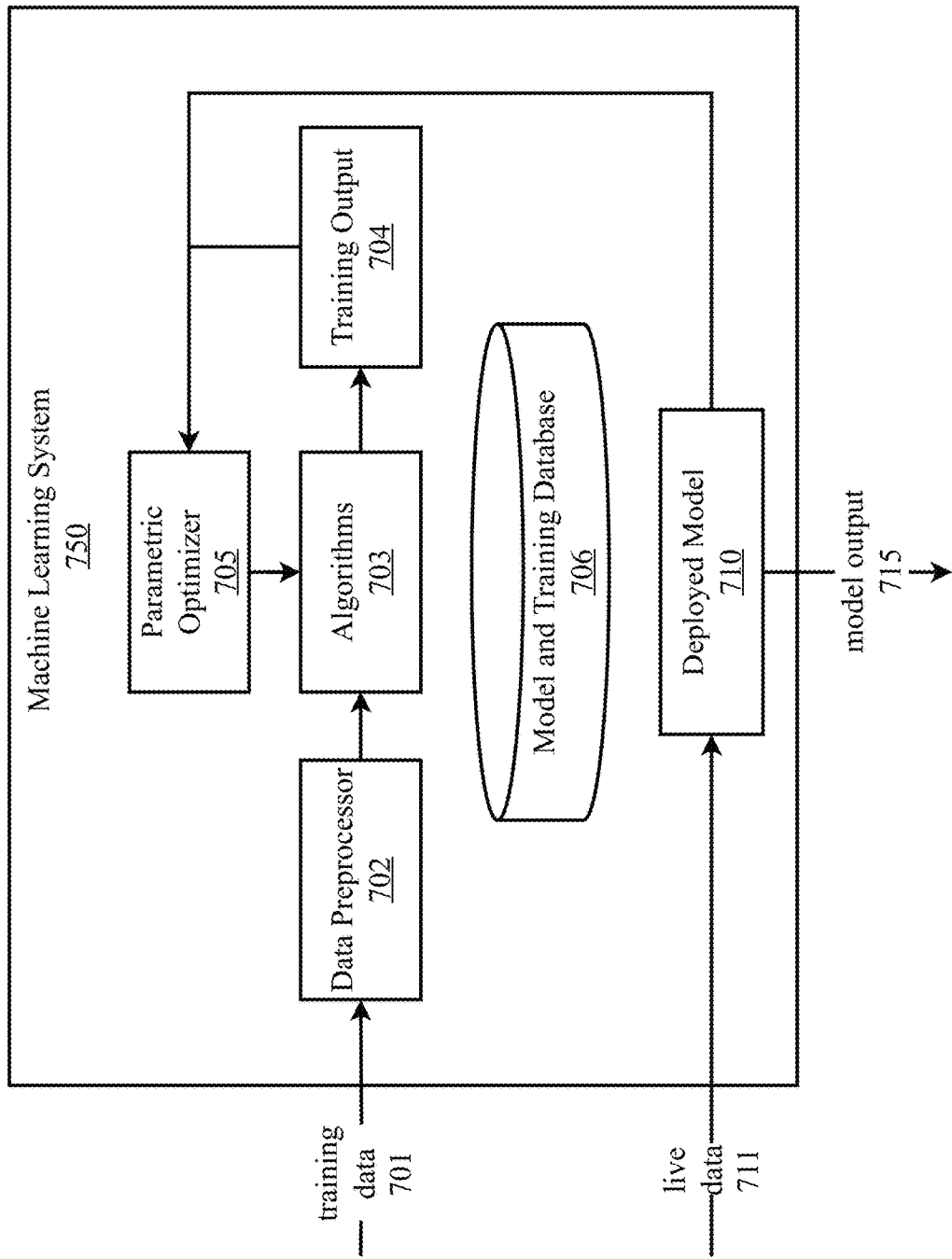
FIG. 7 is a block diagram illustrating an exemplary architecture for a subsystem of the platform for AI-based pricing, mapping, and emissions control, a machine learning system.

FIG. 7 is a block diagram illustrating an exemplary architecture for a subsystem of the platform for AI-based pricing, mapping, and emissions control, a machine learning system 700. According to the embodiment, machine learning engine may comprise a model training stage comprising a data preprocessor 702, one or more machine and/or deep learning algorithms 703, training output 704, and a parametric optimizer 705, and a model deployment stage comprising a deployed and fully trained model 710 configured to perform tasks described herein such as generating traffic, routing, and emission predictions.

At the model training stage, a plurality of training data 701 may be received at machine learning engine 700. In some embodiments, the plurality of training data may be obtained from one or more databases 206, 305, 306, 406 and/or directly from various sources 110a-h and third-party services. Data preprocessor 702 may receive the input data (e.g., road network information, vehicle information, satellite data, etc.) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 702 may also be configured to create a training dataset, a validation dataset, and a test set from the plurality of input data 701. For example, a training dataset may comprise 80% of the preprocessed input data, the validation set 10%, and the test dataset may comprise the remaining 10% of the data. The preprocessed training dataset may be fed as input into one or more machine and/or deep learning algorithms 703 to train a predictive model traffic routing and emissions, for example.

Machine learning engine 700 may be fine-tuned to ensure each model performed in accordance with a desired outcome. Fine-tuning involves adjusting the model's parameters to make it perform better on specific tasks or data. In this case, the goal is to improve the model's performance on video game or simulation data. The fine-tuned models are expected to provide improved accuracy and quality when processing video game or simulation data, which can be crucial for applications like predicting and generating future game states. The refined models can be optimized for real-time processing, meaning they can quickly analyze and understand game states, simulations, and user inputs as they happen. Additionally, by using the smaller, fine-tuned models instead of a larger model for routine tasks, the machine learning system 700 reduces computational costs associated with AI processing.

During model training, training output 704 is produced and used to measure the accuracy and usefulness of the predictive outputs. During this process a parametric optimizer 705 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation units in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by machine learning engine 700 to evaluate a model's performance. Metrics may include, but are not limited to latency between a user input and a generated game state, quality of generated game states, and the realism of generated game states.

The test dataset can be used to test the accuracy of the model outputs. If the training model is making predictions that satisfy a certain criterion then it can be moved to the model deployment stage as a fully trained and deployed model 710 in a production environment making predictions based on live input data 711 (e.g., road network information, vehicle information, satellite data, etc.). Further, model predictions made by a deployed model can be used as feedback and applied to model training in the training stage, wherein the model is continuously learning over time using both training data and live data and predictions.

A model and training database 706 is present and configured to store training/test datasets and developed models. Database 706 may also store previous versions of models.

According to some embodiments, the one or more machine and/or deep learning models may comprise any suitable algorithm known to those with skill in the art including, but not limited to: Large Language Models (LLMs), generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 703 may comprise a deep learning algorithm such as neural networks (e.g., recurrent, convolutional, long short-term memory networks, etc.). According to an embodiment, algorithms 703 may comprise a GA-EED model and/or variants thereof. According to some aspects, user and vehicle behavior models are based on machine learning techniques such as deep learning, reinforcement learning, or Bayesian inference, and are trained on large-scale data sets of user preferences, choice behavior, and vehicle trajectories.

In some implementations, ML engine 700 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in model and training database 706.

Detailed Description of Exemplary Aspects

Figure 8:
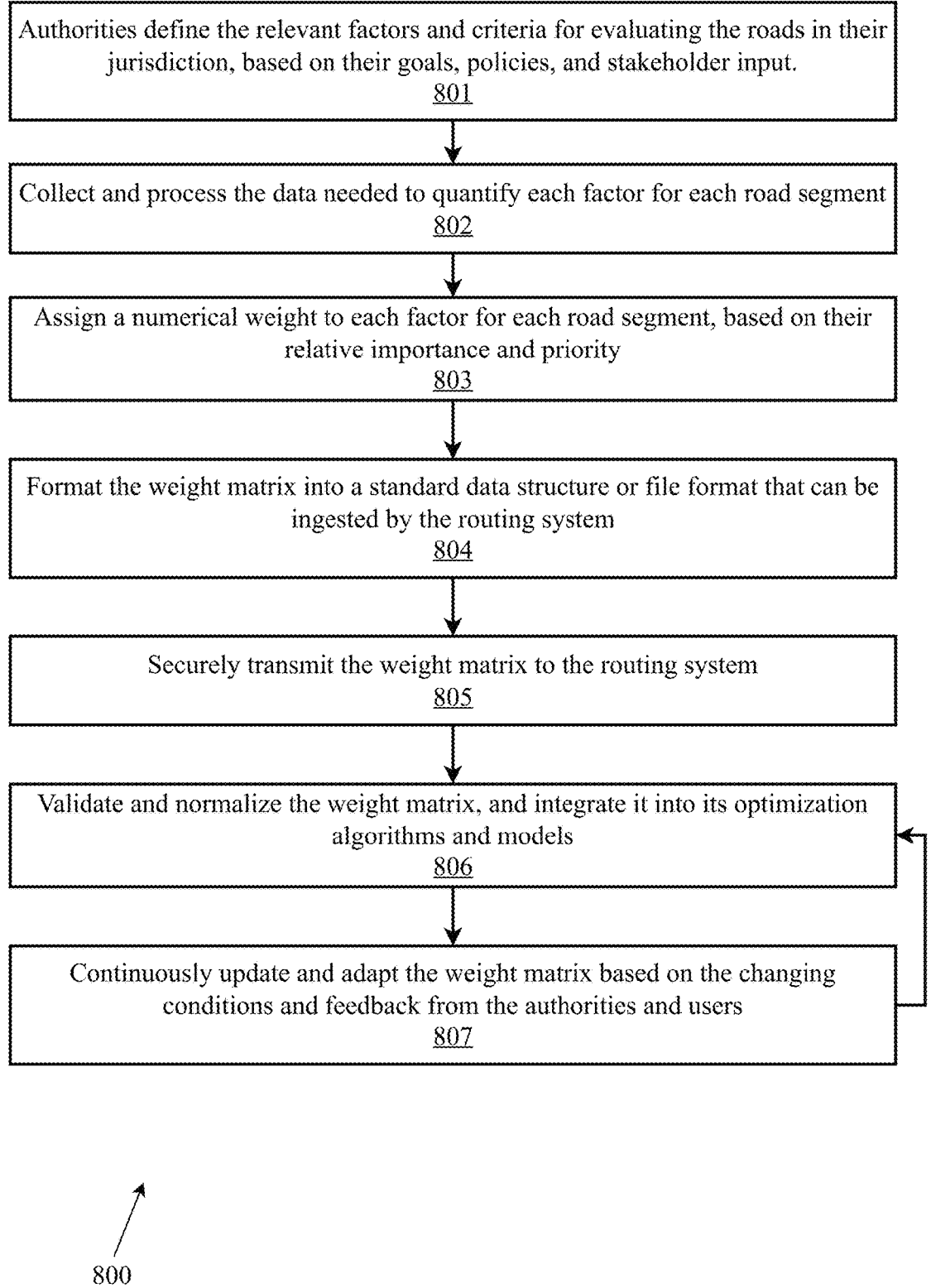
FIG. 8 is a flow diagram illustrating an exemplary method for feeding a weight matrix into the AI-based routing system, according to an embodiment.

FIG. 8 is a flow diagram illustrating an exemplary method 800 for feeding a weight matrix into the AI-based routing system 500, according to an embodiment. According to the embodiment, the process of feeding the weight matrix into the routing system begins at step 801 by local authorities defining the relevant factors and criteria for evaluating the roads in their jurisdiction, based on their goals, policies, and stakeholder input. In some implementations, local authorities can be work with platform administrators to collaboratively define the relevant factors and criteria. At step 802 the authorities and/or platform collect and process the data needed to quantify each factor for each road segment, using various sources such as traffic sensors, emissions models, road surveys, or historical data. At step 803 the authorities and/or platform assign a numerical weight to each factor for each road segment, based on their relative importance and priority, using methods such as pairwise comparison, multi-criteria decision analysis, or expert judgment. The authorities and/or platform can format the weight matrix into a standard data structure or file format that can be ingested by the routing system at step 804, such as, for example a CSV file or JSON object. At step 805 the authorities can securely transmit the weight matrix to the routing system through an API or data pipeline, ensuring the integrity and confidentiality of the data. At step 806 the routing system validates and normalizes the weight matrix, and integrates it into its optimization algorithms and models. This may comprise the use of techniques such as weighted sum, weighted product, or multi-objective optimization, according to the aspect. As a last step 807, the routing system continuously updates and adapts the weight matrix based on the changing conditions and feedback from the authorities and users, using techniques such as, for example, reinforcement learning or Bayesian optimization. The updated weight matrix may be reintegrated into the optimization algorithms and models to provide continuous and dynamic learning and optimizations which reflect the relevant factors and criteria of the authorities, users, and various stakeholders.

Figure 9:
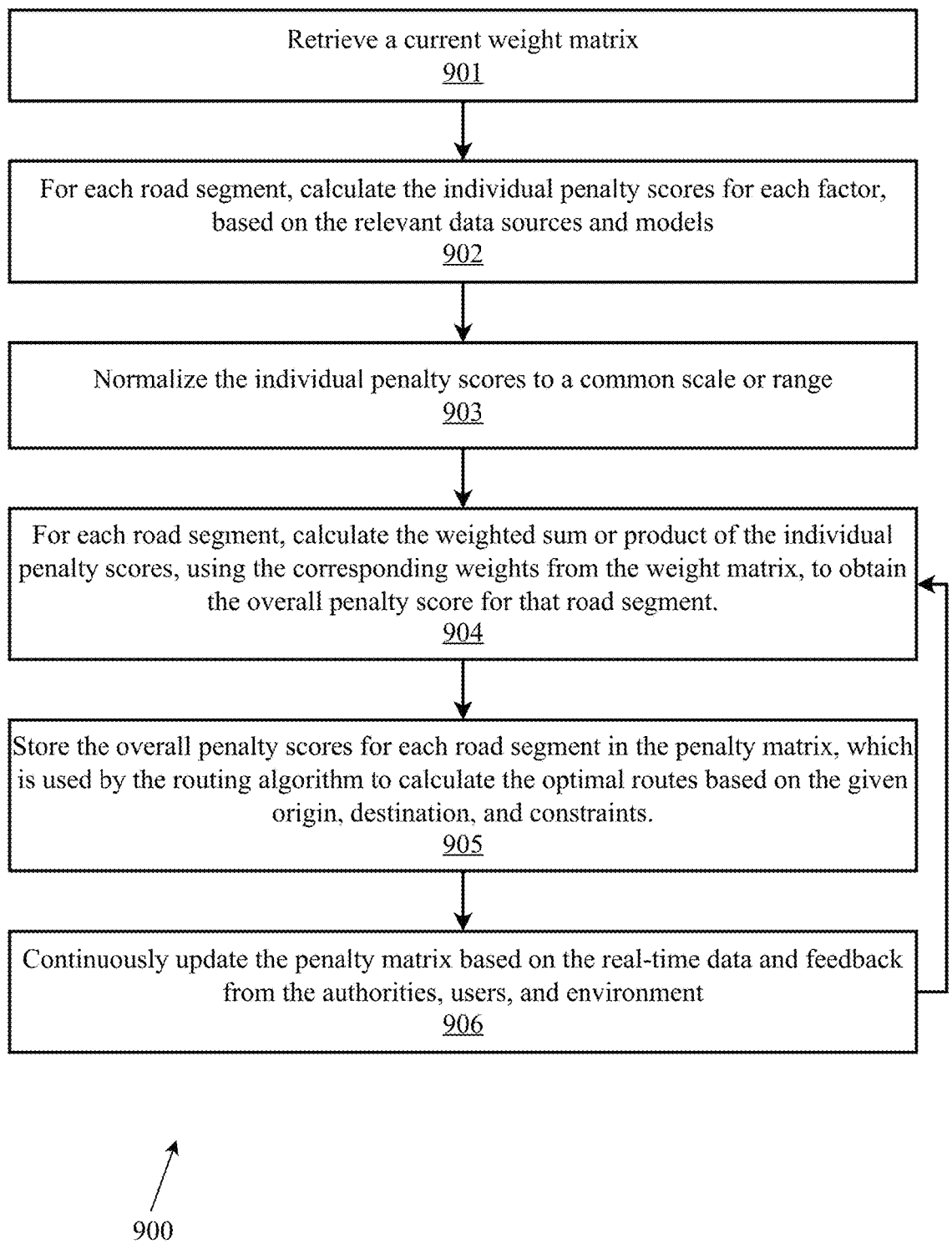
FIG. 9 is a flow diagram illustrating an exemplary method for incorporating a weight matrix into a penalty matrix, according to an embodiment.

FIG. 9 is a flow diagram illustrating an exemplary method 900 for incorporating a weight matrix into a penalty matrix, according to an embodiment. According to the embodiment, the process begins at step 901 when the AI-based routing system 500 receives, retrieves, or otherwise obtains the latest weight matrix from the authorities' database or API, and validates its format and consistency. At step 902, for each road segment, the routing system calculates the individual penalty scores for each factor, based on the relevant data sources and models, such as, for example, the emissions data from the air quality sensors, the congestion data from the traffic cameras, or the pricing data from the toll operators. At step 903, the routing system normalizes the individual penalty scores to a common scale or range to ensure the comparability and consistency of the scores across different factors and road segments. For instance, the scale or range may be 0 to 1 or 0 to 100, or some other suitable range of values. At step 904, for each road segment, the routing system calculates the weighted sum or product of the individual penalty scores, using the corresponding weights from the weight matrix, to obtain the overall penalty score for that road segment. The routing system stores the overall penalty scores for each road segment in the penalty matrix at step 905, which is used by the routing algorithm(s) to calculate the optimal routes based on the given origin, destination, and constraints. At step 906, the routing system continuously updates the penalty matrix based on the real-time data and feedback from the authorities, users, and environment. This may comprise the use of techniques such as dynamic weighting, adaptive penalization, or multi-objective optimization. The updated penalty matrix may then be used to calculate individual penalty scores which can be applied to compute a new overall penalty score for a given road segment.

Figure 10:
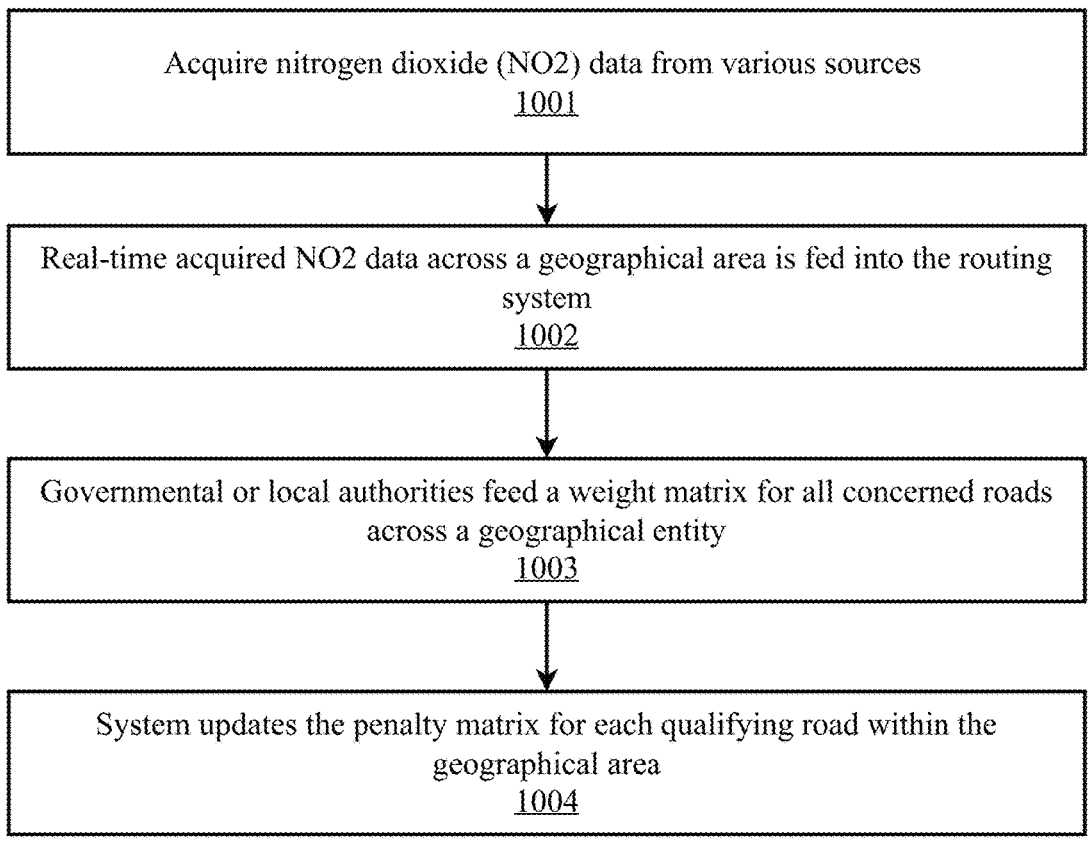
FIG. 10 is a flow diagram illustrating an exemplary method for geo-specific pathway for updating a penalty matrix, according to an embodiment.

FIG. 10 is a flow diagram illustrating an exemplary method 1000 for geo-specific pathway for updating a penalty matrix, according to an embodiment. According to the embodiment, the process begins at step 1001 when platform 120 acquires emissions data including NO2 from various sources such as, for example, satellite instruments. At step 1002, the real-time acquired NO2 data across a geographical area is fed into the routing system. At step 1003, the system receives a weight matrix from governmental or local authorities for all concerned roads across a geographical entity. At step 1004, the platform updates the penalty matrix for each qualifying road within the geographical area/entity.

Figure 11:
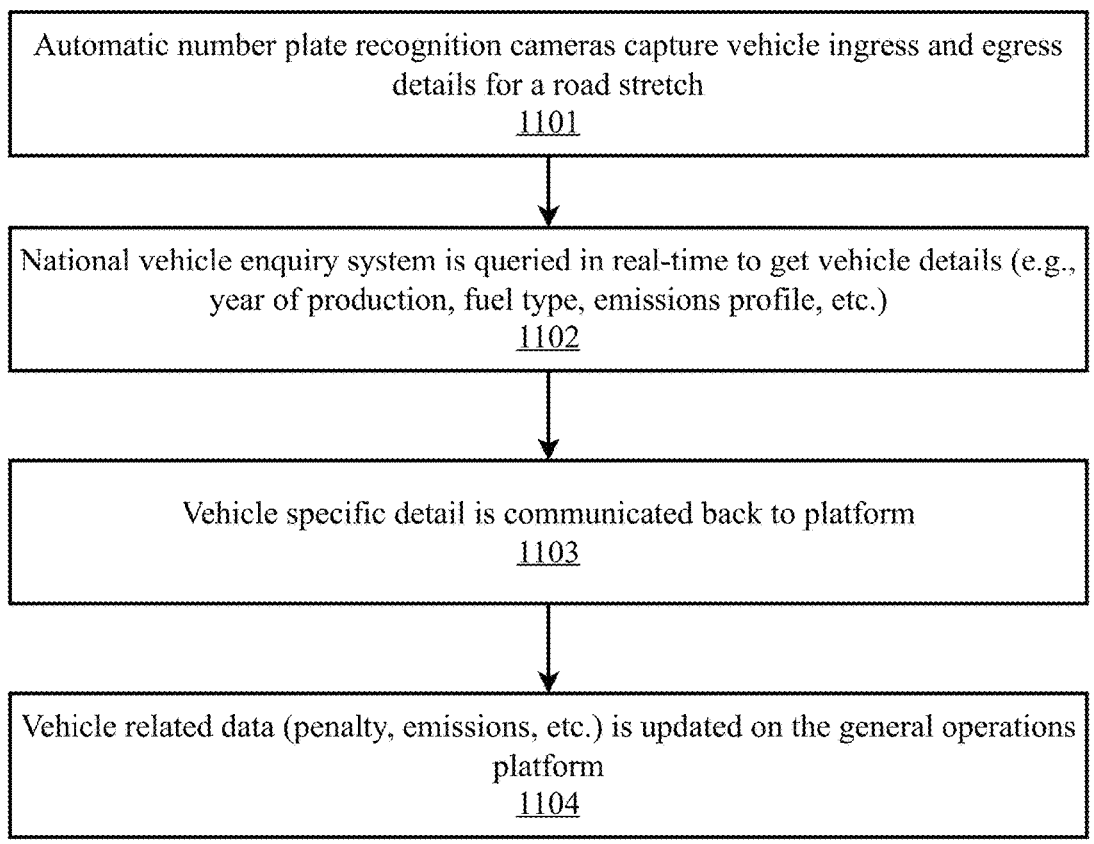
FIG. 11 is a flow diagram illustrating an exemplary method for acquiring vehicle data, according to an embodiment.

FIG. 11 is a flow diagram illustrating an exemplary method 1100 for acquiring vehicle data, according to an embodiment. According to the embodiment, the process begins at step 1101 when automatic number plate recognition cameras capture vehicle ingress and egress details for a road stretch in a given geographical area. Platform may receive vehicle details from one or more ANPR systems and perform AI- or ML-based operations on the details, such as OCR to transform the image data to textual data. This textual data (i.e., textual representation of vehicle license plates) may be used to query databases to obtain vehicle specific information. At step 1102, a national vehicle enquiry system is queried in real-time to get vehicle details (e.g., year of production, fuel type, emissions profile, etc.). The vehicle detail is communicated back to platform 120 at step 1103. The obtained vehicle related data (e.g., penalty, emissions, etc.) is updated on the platform at step 1004. The obtained vehicle data may be stored in vehicle database 406 and accessed by various platform systems/subsystem to facilitate AI-based routing and emissions control.

Figure 12:
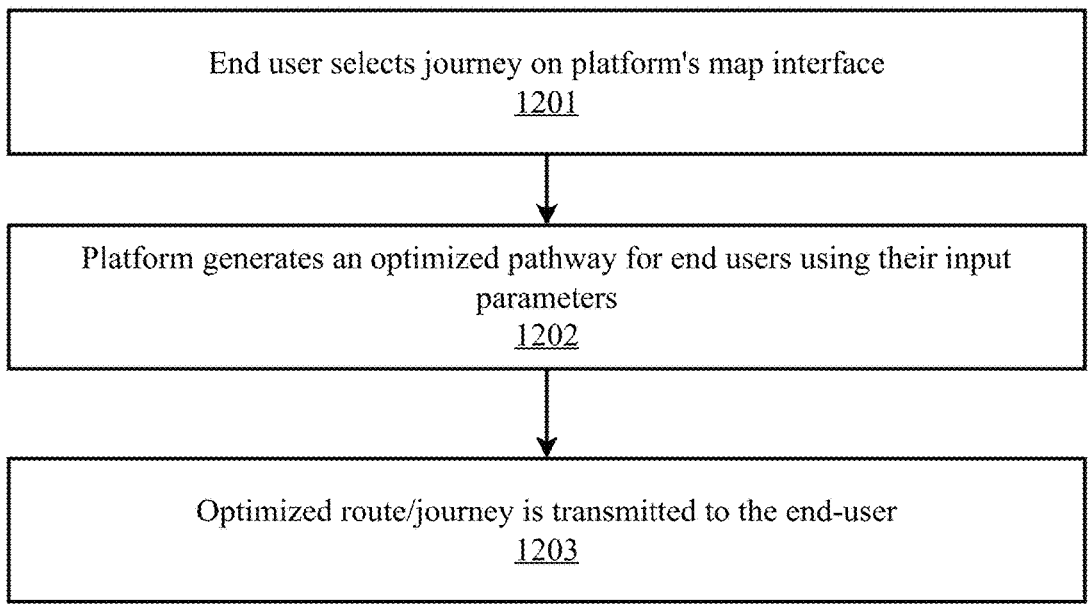
FIG. 12 is a flow diagram illustrating an exemplary method for an end-user interaction with an AI-based dynamic pricing, mapping, and emissions control platform, according to an embodiment.

FIG. 12 is a flow diagram illustrating an exemplary method 1200 for an end-user interaction with an AI-based dynamic pricing, mapping, and emissions control platform

120, according to an embodiment. According to the embodiment, the process begins at step 1201 when an end-user selects a journey on the platform's map interface (or another interface, depending upon the embodiment). The user can select journey details such as a start location, an end location, an optimization schedule, penalty (e.g., pathway that fines the user the least), fuel (e.g., pathway that uses the least fuel or electricity for battery usage), a time constraint (e.g., start/end time, maximum or minimum time to complete the journey), and cost (e.g., pathway that costs the least to user based on a combination of penalty, time, and fuel usage). At step 1202, the platform generates an optimized pathway/route for the end-user using their input parameters. At step 1203, the optimized route/journey is transmitted to the end-user. The end-user can accept the generated route, or they may choose to query the platform for a new route based on different criteria/parameters or without changing anything. The platform can use the user input (e.g., rejection or accepting of generated route) to update the one or more AI/ML optimization models as well as update penalty scores/overall scores with respect to the individual user.

Figure 13:
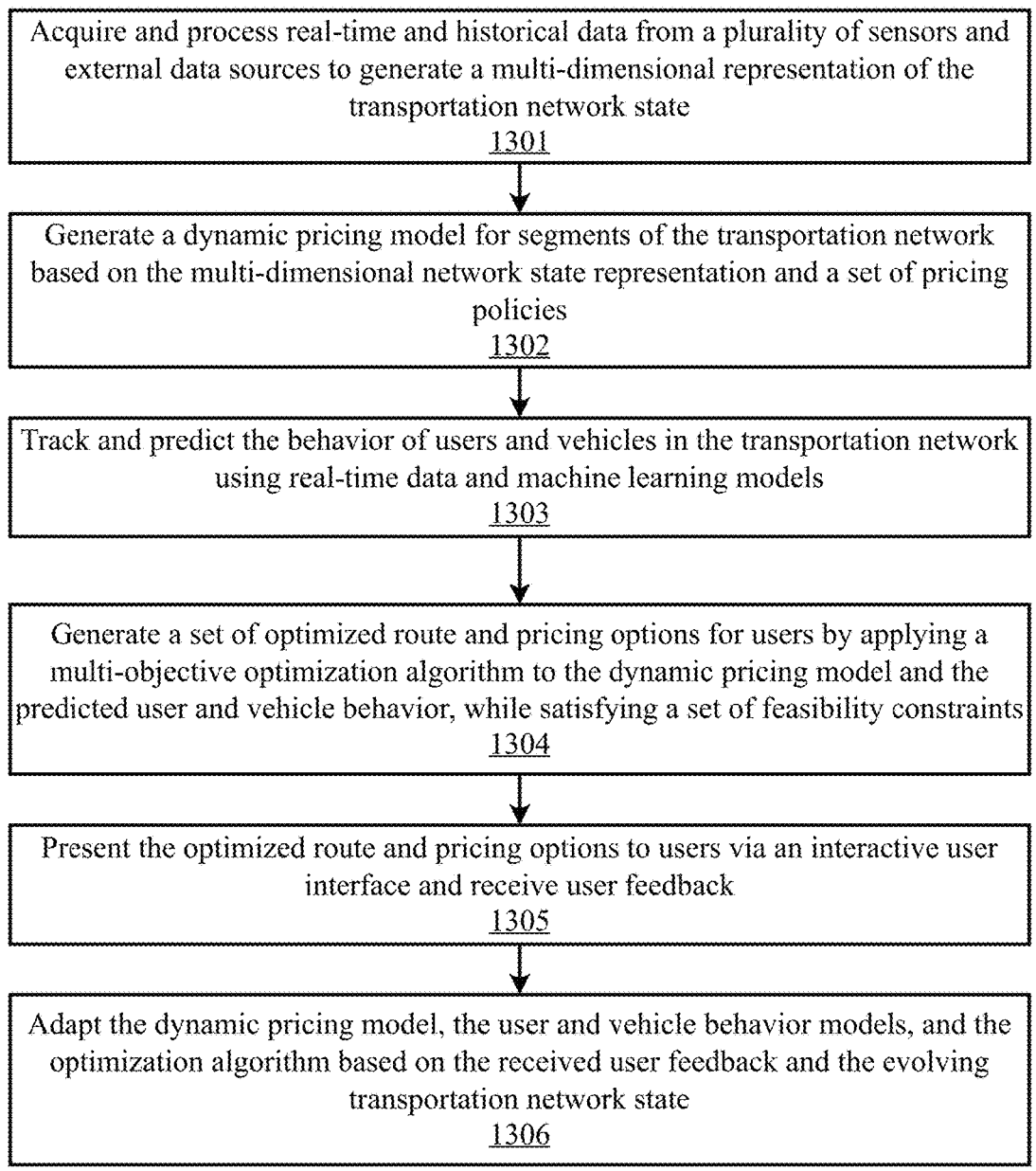
FIG. 13 is a flow diagram illustrating an exemplary method for dynamic optimization of a transportation network, according to an embodiment.

FIG. 13 is a flow diagram illustrating an exemplary method 1300 for dynamic optimization of a transportation network, according to an embodiment. According to the embodiment, the method may be performed by platform 120 and/or one or more of its system/subsystem components. According to the embodiment, the process begins at step 1301 when the system acquires and processes real-time and historical data from a plurality of sensors and external data sources to generate a multi-dimensional representation of a transportation state network. According to an aspect, the transportation state network is an inner-city road network. At step 1302, the system generates a dynamic pricing model for segments of the transportation network based on the multi-dimensional network state representation and a set of pricing policies. According to an aspect, the multi-dimensional network state representation comprises data layers for traffic flow, congestion, emissions, weather, events, and road conditions. At step 1303, the system tracks and predicts the behavior of users and vehicles in the transportation network using real-time data and machine learning models. At step 1304, the system generates a set of optimized route and pricing options for users by applying a multi-objective optimization algorithm to the dynamic pricing model and the predicted user and vehicle behavior, while satisfying a set of feasibility constraints. According to an aspect, the dynamic pricing model is based on a combination of historical data, real-time data, and future predictions, and takes into account factors such as demand, supply, elasticity, and competition. According to an aspect, the user and vehicle behavior models are based on machine learning techniques such as deep learning, reinforcement learning, or Bayesian inference, and are trained on large-scale data sets of user preferences, choice behavior, and vehicle trajectories. According to an aspect, the multi-objective optimization algorithm is based on a metaheuristic such as genetic algorithms, particle swarm optimization, or simulated annealing, and is adapted to handle dynamic and stochastic problem instances.

At step 1305, the system presents the optimized route and pricing options to users via an interactive user interface and receives user feedback. According to an aspect, the interactive user interface includes features for personalization, gamification, and incentivization to encourage user engagement and behavior change. At step 1306, the system adapts the dynamic pricing model, the user and vehicle behavior models, and the optimization algorithm based on the received user feedback and the evolving transportation network state.

According to some aspects, the system and method employs a genetic algorithm economic and environmental dispatch (GA-EED) tool to optimize the selection of routes considering various economic and environmental criteria, such as minimizing fuel consumption, emissions, travel time, and road congestion, while balancing the trade-offs between these criteria based on user preferences and system goals. According to some aspects, the system and method integrates with an improved comfort biased smart home load manager (iCBSHLM) to optimize the charging and discharging of electric vehicles (EVs) at home, considering the user's comfort preferences, energy prices, and emissions intensity of the grid, and provides personalized recommendations and incentives to the user for optimizing their EV usage and home energy consumption. According to some aspects, the system incorporates a penalty matrix that assigns numerical costs to each road segment based on factors such as environmental impact, congestion, road pricing, safety risk, and user preferences, and updates the penalty matrix dynamically based on real-time data from sensors, weather stations, and traffic management systems to discourage the use of certain roads or areas and promote more sustainable and efficient route choices.

Exemplary Computing Environment

Figure 14:
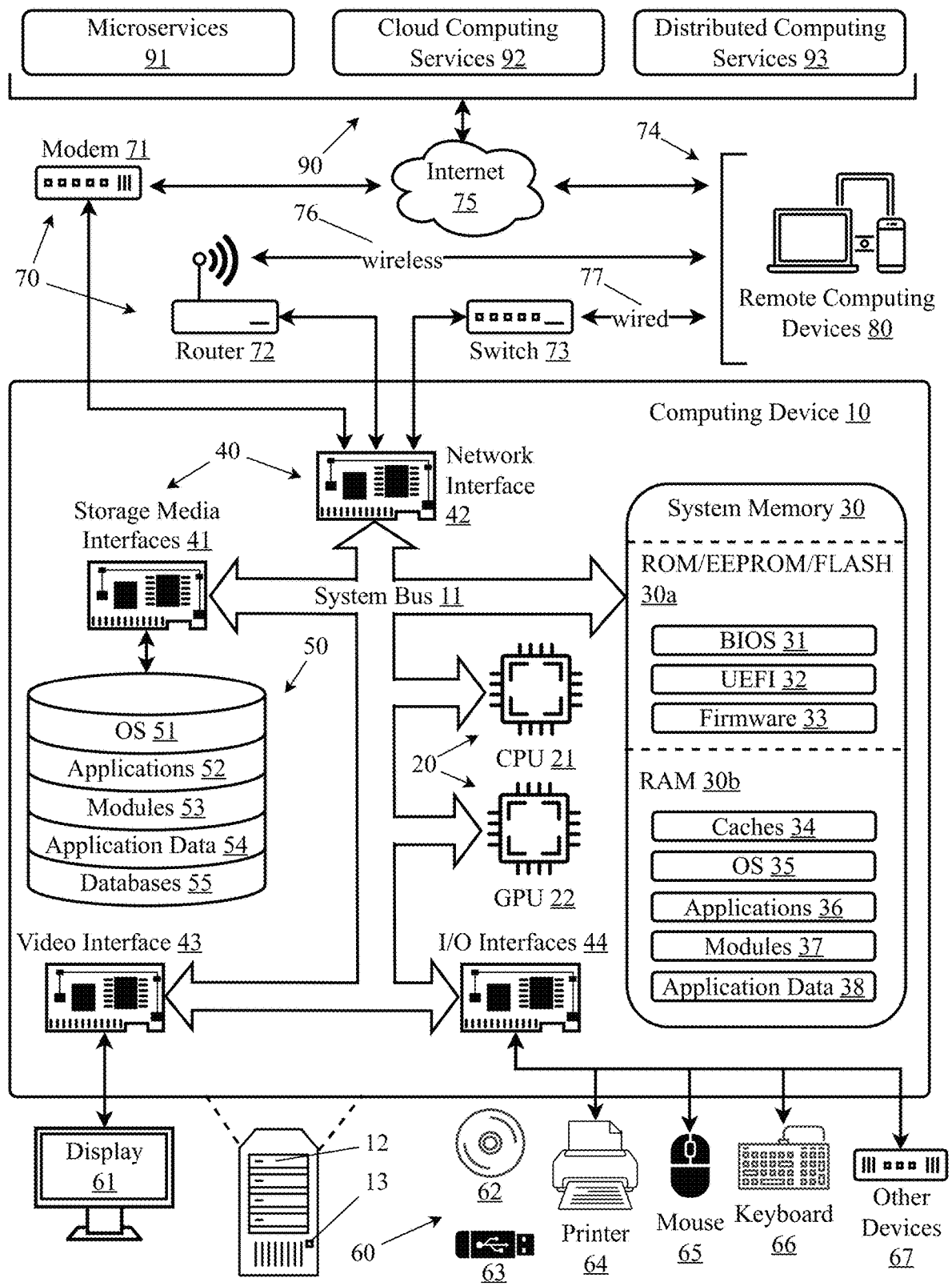
FIG. 14 illustrates an exemplary computing environment on which an embodiment described herein may be implemented.

FIG. 14 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-onsubstrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. An artificial intelligence-based platform for dynamic optimization of a transportation network, comprising:
a computing device comprising at least a memory and a processor;
a plurality of programming instructions stored in the memory and operable on the processor, wherein the plurality of programming instructions, when operating on the processor, cause the computing device to:
acquire and process real-time and historical data from a plurality of sensors and external data sources to generate a multi-dimensional representation of the transportation network state;
generate a dynamic pricing model for segments of the transportation network based on the multi-dimensional network state representation and a set of pricing policies;
track and predict the behavior of users and vehicles in the transportation network using real-time data and machine learning models;
generate a set of optimized route and pricing options for users by applying a multi-objective optimization algorithm to the dynamic pricing model and the predicted user and vehicle behavior, while satisfying a set of feasibility constraints;
present the optimized route and pricing options to users via an interactive user interface and receive user feedback;
adapt the dynamic pricing model, the user and vehicle behavior models, and the optimization algorithm based on the received user feedback and the evolving transportation network state; and
manage and orchestrate the data flows and interactions between the system components using a centralized or decentralized architecture.

2. The platform of claim 1, wherein the transportation network is an inner-city road network, and the optimization objectives comprise minimizing travel time, emissions, and cost for users and the system operator.

3. The platform of claim 1, wherein the multi-dimensional network state representation comprises data layers for traffic flow, congestion, emissions, weather, events, and road conditions.

4. The platform of claim 1, wherein the dynamic pricing model is based on a combination of historical data, real-time data, and future predictions, and takes into account factors such as demand, supply, elasticity, and competition.

5. The platform of claim 1, wherein the user and vehicle behavior models are based on machine learning techniques such as deep learning, reinforcement learning, or Bayesian inference, and are trained on large-scale data sets of user preferences, choice behavior, and vehicle trajectories.

6. The platform of claim 1, wherein the multi-objective optimization algorithm is based on a metaheuristic such as genetic algorithms, particle swarm optimization, or simulated annealing, and is adapted to handle dynamic and stochastic problem instances.

7. The platform of claim 1, wherein the interactive user interface comprises features for personalization, gamification, and incentivization to encourage user engagement and behavior change.

8. The platform of claim 1, wherein the multi-objective optimization algorithm comprises a genetic algorithm economic and environmental dispatch (GA-EED) tool that optimizes the selection of routes considering various economic and environmental criteria, such as minimizing fuel consumption, emissions, travel time, and road congestion, while balancing the trade-offs between these criteria based on user preferences and system goals.

9. The platform of claim 1, wherein the platform integrates with an improved comfort biased smart home load manager to optimize the charging and discharging of electric vehicles (EVs) at home, considering the user's comfort preferences, energy prices, and emissions intensity of the grid, and provides personalized recommendations and incentives to the user for optimizing their EV usage and home energy consumption, thereby adapting the user and vehicle behavior models based on the received user feedback.

10. The platform of claim 1, wherein the platform incorporates a penalty matrix that assigns numerical costs to each road segment based on factors such as environmental impact, congestion, road pricing, safety risk, and user preferences, and updates the penalty matrix dynamically based on real-time data from sensors, weather stations, and traffic management systems, thereby adapting the dynamic pricing model based on the evolving transportation network state.

11. A method for dynamic optimization of a transportation network, comprising the steps of:
acquiring and processing real-time and historical data from a plurality of sensors and external data sources to generate a multi-dimensional representation of the transportation network state;
generating a dynamic pricing model for segments of the transportation network based on the multi-dimensional network state representation and a set of pricing policies;
tracking and predicting the behavior of users and vehicles in the transportation network using real-time data and machine learning models;
generating a set of optimized route and pricing options for users by applying a multi-objective optimization algorithm to the dynamic pricing model and the predicted user and vehicle behavior, while satisfying a set of feasibility constraints;
presenting the optimized route and pricing options to users via an interactive user interface and receiving user feedback;
adapting the dynamic pricing model, the user and vehicle behavior models, and the optimization algorithm based on the received user feedback and the evolving transportation network state; and
managing and orchestrating the data flows and interactions between the system components using a centralized or decentralized architecture.

12. The method of claim 11, wherein the transportation network is an inner-city road network, and the optimization objectives comprise minimizing travel time, emissions, and cost for users and the system operator.

13. The method of claim 11, wherein the multi-dimensional network state representation comprises data layers for traffic flow, congestion, emissions, weather, events, and road conditions.

14. The method of claim 11, wherein the dynamic pricing model is based on a combination of historical data, real-time data, and future predictions, and takes into account factors such as demand, supply, elasticity, and competition.

15. The method of claim 11, wherein the user and vehicle behavior models are based on machine learning techniques such as deep learning, reinforcement learning, or Bayesian inference, and are trained on large-scale data sets of user preferences, choice behavior, and vehicle trajectories.

16. The method of claim 11, wherein the multi-objective optimization algorithm is based on a metaheuristic such as genetic algorithms, particle swarm optimization, or simulated annealing, and is adapted to handle dynamic and stochastic problem instances.

17. The method of claim 11, wherein the interactive user interface comprises features for personalization, gamification, and incentivization to encourage user engagement and behavior change.

18. The method of claim 11, wherein the multi-objective optimization algorithm comprises a genetic algorithm economic and environmental dispatch (GA-EED) tool that optimizes the selection of routes considering various economic and environmental criteria, such as minimizing fuel consumption, emissions, travel time, and road congestion, while balancing the trade-offs between these criteria based on user preferences and system goals.

19. The method of claim 11, further comprising the steps of integrating with an improved comfort biased smart home load manager to optimize the charging and discharging of electric vehicles (EVs) at home, considering the user's comfort preferences, energy prices, and emissions intensity of the grid, and providing personalized recommendations and incentives to the user for optimizing their EV usage and home energy consumption, thereby adapting the user and vehicle behavior models based on the received user feedback.

20. The method of claim 11, further comprising the steps of incorporating a penalty matrix that assigns numerical costs to each road segment based on factors such as environmental impact, congestion, road pricing, safety risk, and user preferences, and updating the penalty matrix dynamically based on real-time data from sensors, weather stations, and traffic management systems, thereby adapting the dynamic pricing model based on the evolving transportation network state.

21. Non-transitory, computer-readable storage media having computer-executable instructions embodied thereon that, when executed by one or more processors of a computing system employing an artificial intelligence based platform for dynamic optimization of a transportation network, cause the computing system to:
  acquire and process real-time and historical data from a plurality of sensors and external data sources to generate a multi-dimensional representation of the transportation network state;
  generate a dynamic pricing model for segments of the transportation network based on the multi-dimensional network state representation and a set of pricing policies;
  track and predict the behavior of users and vehicles in the transportation network using real-time data and machine learning models;
  generate a set of optimized route and pricing options for users by applying a multi-objective optimization algorithm to the dynamic pricing model and the predicted user and vehicle behavior, while satisfying a set of feasibility constraints;
  present the optimized route and pricing options to users via an interactive user interface and receive user feedback;
  adapt the dynamic pricing model, the user and vehicle behavior models, and the optimization algorithm based on the received user feedback and the evolving transportation network state; and
  manage and orchestrate the data flows and interactions between the system components using a centralized or decentralized architecture.

22. The non-transitory, computer-readable storage media of claim 21, wherein the transportation network is an inner-city road network, and the optimization objectives comprise minimizing travel time, emissions, and cost for users and the system operator.

23. The non-transitory, computer-readable storage media of claim 21, wherein the multi-dimensional network state representation comprises data layers for traffic flow, congestion, emissions, weather, events, and road conditions.

24. The non-transitory, computer-readable storage media of claim 21, wherein the dynamic pricing model is based on a combination of historical data, real-time data, and future predictions, and takes into account factors such as demand, supply, elasticity, and competition.

25. The non-transitory, computer-readable storage media of claim 21, wherein the user and vehicle behavior models are based on machine learning techniques such as deep learning, reinforcement learning, or Bayesian inference, and are trained on large-scale data sets of user preferences, choice behavior, and vehicle trajectories.

26. The non-transitory, computer-readable storage media of claim 21, wherein the multi-objective optimization algorithm is based on a metaheuristic such as genetic algorithms, particle swarm optimization, or simulated annealing, and is adapted to handle dynamic and stochastic problem instances.

27. The non-transitory, computer-readable storage media of claim 21, wherein the interactive user interface comprises features for personalization, gamification, and incentivization to encourage user engagement and behavior change.

28. The non-transitory, computer-readable storage media of claim 21, wherein the multi-objective optimization algorithm comprises a genetic algorithm economic and environmental dispatch (GA-EED) tool that optimizes the selection of routes considering various economic and environmental criteria, such as minimizing fuel consumption, emissions, travel time, and road congestion, while balancing the trade-offs between these criteria based on user preferences and system goals.

29. The non-transitory, computer-readable storage media of claim 21, wherein the computing system integrates with an improved comfort biased smart home load manager to optimize the charging and discharging of electric vehicles (EVs) at home, considering the user's comfort preferences, energy prices, and emissions intensity of the grid, and provides personalized recommendations and incentives to the user for optimizing their EV usage and home energy consumption, thereby adapting the user and vehicle behavior models based on the received user feedback.

30. The non-transitory, computer-readable storage media of claim 21, wherein the computing system incorporates a penalty matrix that assigns numerical costs to each road segment based on factors such as environmental impact, congestion, road pricing, safety risk, and user preferences, and updates the penalty matrix dynamically based on real-time data from sensors, weather stations, and traffic management systems, thereby adapting the dynamic pricing model based on the evolving transportation network state.

* * * * *